United States Patent
Korablev et al.

(10) Patent No.: US 8,433,717 B2
(45) Date of Patent: Apr. 30, 2013

(54) SYSTEM AND METHOD FOR EFFICIENTLY SECURING ENTERPRISE DATA RESOURCES

(75) Inventors: Dmitri Korablev, Walnut Creek, CA (US); Gregory Danforth, Flagstaff, AZ (US)

(73) Assignee: Informatica Corporation, Redwood City, CA (US)

( * ) Notice: Subject to any disclaimer, the term of this patent is extended or adjusted under 35 U.S.C. 154(b) by 0 days.

(21) Appl. No.: 13/419,406

(22) Filed: Mar. 13, 2012

(65) Prior Publication Data

US 2012/0233689 A1 Sep. 13, 2012

Related U.S. Application Data

(63) Continuation of application No. 12/194,405, filed on Aug. 19, 2008, now Pat. No. 8,166, 071.

(60) Provisional application No. 61/055,430, filed on May 22, 2008, provisional application No. 61/082,504, filed on Jul. 21, 2008, provisional application No. 61/087,977, filed on Aug. 11, 2008, provisional application No. 61/082,505, filed on Jul. 21, 2008, provisional application No. 61/085,815, filed on Aug. 1, 2008.

(51) Int. Cl.
*G06F 7/00* (2006.01)

(52) U.S. Cl.
USPC .......................................................... 707/758

(58) Field of Classification Search .................. 707/758, 707/694, 783
See application file for complete search history.

(56) References Cited

U.S. PATENT DOCUMENTS

| | | | |
|---|---|---|---|
| 5,734,887 A | 3/1998 | Kingberg et al. |
| 5,884,325 A | 3/1999 | Bauer et al. |
| 6,014,647 A | 1/2000 | Nizzari et al. |
| 6,151,608 A | 11/2000 | Abrams |
| 6,324,541 B1 | 11/2001 | de l'Etraz et al. |
| 6,332,163 B1 | 12/2001 | Bowman-Amuah |
| 6,345,288 B1 | 2/2002 | Reed et al. |
| 6,477,580 B1 | 11/2002 | Bowman-Amuah |
| 6,519,571 B1 | 2/2003 | Guheen et al. |

(Continued)

FOREIGN PATENT DOCUMENTS

| | | |
|---|---|---|
| AU | 2003231931 | 12/2003 |
| AU | 2009222633 | 10/2009 |

(Continued)

OTHER PUBLICATIONS

U.S. Appl. No. 12/194,407, filed Aug. 19, 2008, Korablev, Dmitri, et al.

(Continued)

*Primary Examiner* — Truong Vo

(74) *Attorney, Agent, or Firm* — Adeli & Tollen LLP

(57) ABSTRACT

Some embodiments provide a system and method that secures access to data objects of an enterprise that includes multiple data objects and multiple user applications that access data attributes of the data objects. In some embodiments, secure access is provided via a secure resource that secures access to data attributes of at least two objects by defining access control permissions for the secure resource and applying the defined access control permissions to the data attributes of the secure resource.

21 Claims, 21 Drawing Sheets

U.S. PATENT DOCUMENTS

| | | | |
|---|---|---|---|
| 6,523,041 B1 | 2/2003 | Morgan et al. | |
| 6,529,909 B1 | 3/2003 | Bowman-Amuah | |
| 6,529,948 B1 | 3/2003 | Bowman-Amuah | |
| 6,542,896 B1 | 4/2003 | Gruenwald | |
| 6,604,113 B1 | 8/2003 | Kenyon et al. | |
| 6,718,386 B1 | 4/2004 | Hanfland | |
| 6,839,720 B1 | 1/2005 | Thibodeau | |
| 7,356,840 B1 | 4/2008 | Bedell et al. | |
| 7,496,588 B2 | 2/2009 | Wong et al. | |
| 7,509,326 B2 | 3/2009 | Krabel et al. | |
| 7,523,121 B2 | 4/2009 | Hoang et al. | |
| 7,822,660 B1 | 10/2010 | Donoho et al. | |
| 8,065,266 B2 | 11/2011 | Hoang et al. | |
| 8,150,803 B2 | 4/2012 | Hoang et al. | |
| 8,166,048 B2 | 4/2012 | Wong et al. | |
| 8,166,071 B1 | 4/2012 | Korablev et al. | |
| 8,200,622 B2 | 6/2012 | Hoang | |
| 8,224,873 B1 | 7/2012 | Korablev et al. | |
| 8,271,477 B2 | 9/2012 | Sood et al. | |
| 2001/0051946 A1 | 12/2001 | Nishikawa | |
| 2003/0065659 A1 | 4/2003 | Agarwal et al. | |
| 2003/0069780 A1 | 4/2003 | Hailwood et al. | |
| 2003/0084016 A1 | 5/2003 | Norgaard et al. | |
| 2003/0105887 A1 | 6/2003 | Cox et al. | |
| 2003/0154401 A1 | 8/2003 | Hartman et al. | |
| 2003/0167253 A1 | 9/2003 | Meinig | |
| 2003/0212654 A1 | 11/2003 | Harper et al. | |
| 2003/0217333 A1 | 11/2003 | Smith et al. | |
| 2003/0236776 A1 | 12/2003 | Nishimura et al. | |
| 2004/0117358 A1 | 6/2004 | von Kaenel et al. | |
| 2004/0243613 A1 | 12/2004 | Pourheidari | |
| 2005/0033726 A1 | 2/2005 | Wu et al. | |
| 2005/0066059 A1 | 3/2005 | Zybura et al. | |
| 2005/0097353 A1 | 5/2005 | Patrick et al. | |
| 2005/0149539 A1 | 7/2005 | Cameron et al. | |
| 2005/0177570 A1 | 8/2005 | Dutta et al. | |
| 2005/0228805 A1 | 10/2005 | Britton et al. | |
| 2005/0278270 A1 | 12/2005 | Carr et al. | |
| 2006/0036755 A1 | 2/2006 | Abdullah et al. | |
| 2006/0179027 A1 | 8/2006 | Bechtel et al. | |
| 2007/0027898 A1 | 2/2007 | Jones et al. | |
| 2007/0214179 A1 | 9/2007 | Hoang | |
| 2008/0060058 A1* | 3/2008 | Shea et al. | 726/4 |
| 2008/0235231 A1 | 9/2008 | Gass et al. | |
| 2008/0275731 A1 | 11/2008 | Rao et al. | |
| 2009/0199273 A1 | 8/2009 | Yalamanchi | |
| 2012/0110022 A1 | 5/2012 | Hoang et al. | |

FOREIGN PATENT DOCUMENTS

| | | |
|---|---|---|
| EP | 1118948 | 7/2001 |
| EP | 1509878 | 3/2005 |
| EP | 1974249 | 10/2008 |
| EP | 1974276 | 10/2008 |
| JP | 11-232327 | 8/1999 |
| WO | WO 01/15030 | 3/2001 |
| WO | WO 02/063491 | 8/2002 |
| WO | WO 03/102867 | 12/2003 |
| WO | WO 2005/064491 | 7/2005 |
| WO | WO 2007/002686 | 1/2007 |
| WO | WO 2007/079467 | 7/2007 |
| WO | WO 2007/081666 | 7/2007 |

OTHER PUBLICATIONS

U.S. Appl. No. 13/526,480, filed Jun. 18, 2012, Korablev, Dmitri, et al.
Portions of prosecution history of U.S. Appl. No. 12/194,407, filed Nov. 5, 2012, Korablev, Dmitri, et al.
Portions of prosecution history of U.S. Patent Appl. No. 12/194,405, filed Mar. 7, 2012, Korablev, Dmitri, et al.
Portions of prosecution history of U.S. Appl. No. 12/194,421, filed Jun. 7, 2012, Korablev, Dmitri, et al.
Portions of prosecution history of U.S. Appl. No. 13/526,480, filed Sep. 19, 2012, Korablev, Dmitri, et al.
International Search Report for PCT/US2003/017125, (mailing date) Sep. 11, 2003, Siperian, Inc.
International Search Report and Written Opinion for PCT/US2006/025017, (mailing date) Jul. 31, 2007, Siperian, Inc.
International Preliminary Report on Patentability for PCT/US2006/025017, (mailing date) Jan. 17, 2008, Siperian, Inc.
International Search Report and Written Opinion for PCT/US2006/062721, (mailing date) Feb. 14, 2008, Siperian, Inc.
International Preliminary Report on Patentability for PCT/US2006/062721, (mailing date) Jul. 17, 2008, Siperian, Inc.
International Search Report and Written Opinion for PCT/US2007/060021, (mailing date) Feb. 15, 2008, Siperian, Inc.
International Preliminary Report on Patentability for PCT/US2007/060021, (mailing date) Jul. 17, 2008, Siperian, Inc.
Chieu, Trieu C., et al., "Unified Solution for Procurement Integration and B2B Stores," ACM, Sep. 2003, pp. 61-67, ACM, Pittsburg, PA.
Fung, Chun Che, et al., "Intelligent Meters for Improved System Operation and Customer Relationship Management," International Conference on Power System Technology, May 2002, pp. 1758-1762, vol. 3, IEEE.
Ponniah, Paulraj, "Data Warehousing Fundamentals: A Comprehensive Guide for IT Professionals," Month Unknown 2001, 527 pages, John Wiley & Sons, Inc., New York, NY.
Walton, Cheryl, "Managing Multiple Databases," http://support.novell.com/techcenter/articles/nc1999_10b.html, Oct. 1, 1999, Novell.

* cited by examiner

SYSTEM AND METHOD FOR EFFICIENTLY SECURING ENTERPRISE DATA RESOURCES

CLAIM OF BENEFIT TO PRIOR APPLICATIONS

This application is a continuation application of U.S. patent application Ser. No. 12/194,405, now issued as U.S. Pat. No. 8,166,071, entitled "System and Method for Efficiently Securing Enterprise Data Resources," filed Aug. 19, 2008 now U.S. Pat. No. 8,166,071. U.S. patent application Ser. No. 12/194,405 claims the benefit of U.S. Provisional Application 61/055,430, entitled "System and Method for Efficiently Securing Enterprise Data Fields," filed May 22, 2008; U.S. Provisional Application 61/082,504, entitled "System and Method for Efficiently Securing Enterprise Data Resources," filed Jul. 21, 2008; and U.S. Provisional Application 61/087,977, entitled "System and Method for Efficiently Securing Enterprise Data Resources," filed Aug. 11, 2008. The contents of all the above mentioned applications, namely Ser. No. 12/194,405, now issued as U.S. Pat. No. 8,166,071, 61/055,430, 61/082,504, and 61/087,977 are hereby incorporated by reference. U.S. patent application Ser. No. 12/194,405 also claims the benefit of U.S. Provisional Application 61/082,505, entitled "System and Method for Flexible Security Access Management in an Enterprise," filed Jul. 21, 2008; and U.S. Provisional Application 61/085,815, entitled "System and Method for Flexible Security Access Management in an Enterprise," filed Aug. 1, 2008.

FIELD OF THE INVENTION

The present invention relates to the field of data integration and data management, and in particular, to methods and systems for securing access to the data.

BACKGROUND OF THE INVENTION

In many different enterprises, multiple applications and data sources exist that create challenges in reconciling and managing a unified view of a data entity across the enterprise. For instance, data related to an entity such as customer or product is strewn across various systems (e.g., applications and data storages). Several of these systems have separate data repositories and thus store their own version of the entity data. In other words, the data storages of an enterprise might store multiple instances of a data record for a particular entity. This redundant data may cause problems for the enterprise that uses the data.

To overcome this issue, some enterprises maintain master data in a master data store. Master data represents the common or shared set of entities providing context for the transactions that occur in the enterprise across the various applications and data storages. For instance, in a sale transaction of 10 units of Widget A to customer Alpha, the transaction can only be fulfilled and processed by an enterprise if all systems in the enterprise share the consistent definitions of product definition (i.e., Widget A) and the customer (i.e., Alpha). Although the list is non-exhaustive, examples of entities include organizations, enterprises, companies, customers, individuals, services, accounts, products, etc.

The master data may include one or more master data objects, each master data object including a set of data attributes specified by the enterprise (e.g., data administrator, business user). In some enterprises, these data attributes are specified based on the reference data (i.e., data that identifies entities) of multiple different data sources. In addition to master reference data objects, some enterprises may also maintain a "best version" of relationship data (i.e., data that expresses a relationship between entities) for some or all the entities that are tracked by the enterprise. Additional description for master data and master data management is provided for in the U.S. patent application Ser. No. 11/957,398 filed on Dec. 12, 2007, now issued as U.S. Pat. No. 8,272,477, which is incorporated herein by reference.

When an enterprise attempts data integration or data sharing, a fundamental problem is how to define access control for allowing and restricting access to the master data. A conventional approach taken by many data integration solutions is to secure the master data using a standardized security access control model for the enterprise. One such model is a role based access control model.

In a role based access control model, roles are configured to specify certain level of access privileges to various entities of the enterprise based on the operations or functions performed by a particular entity. Each role defines specific access control permissions (e.g., read, write, merge, no access, etc.) to the various master data objects or individual data attributes of the data objects. For an enterprise that includes hundreds of different roles, administration of the role based access control can be simplified by adapting a hierarchical approach towards defining the access control permissions for each role. For instance, some of the following hierarchical relationships may be established to simplify security administration using a role based access control model: (1) a particular role may be associated with multiple different users, (2) a particular user may be associated with multiple different roles, (3) a particular access permission may be associated with multiple roles, (4) a particular role may be associated with multiple access permissions, or (5) access permissions defined for a parent role may be automatically inherited by a child role.

In an enterprise which requires the master data to be accessed by several different entities, role based access control provides security administration with a low overhead cost. A security administrator need not specify access rights for each user that enters or leaves the enterprise. Instead, the security administrator assigns a role to the user or a group of users and access rights are automatically associated with the role. Similarly, the security administrator need not specify access rights for each individual data attribute that is entered or modified within the various data objects.

FIG. 1 illustrates securing access to data using the role based access control model. In this figure, users 110 and 120 attempt to access data attributes of an accounts data object 130 that includes various data attributes represented by the various columns of the data object 130. Each user 110 and 120 is assigned a different role. Each role is provided with different access rights to all data attributes of the data object 130. Specifically, user 110 is assigned the role of a bank manager and is provided read and write access to the data attributes of the accounts object 130 based on the bank manager role. User 120 is assigned the role of a financial advisor and is provided less access to the data attributes of the accounts object 130 than the bank manager 110. In this figure, the role of the financial advisor is only privileged to read the data attributes within the accounts object 130, but not write to the data attributes of the accounts object 130.

However, role based access control has many shortcomings in providing adequate security access control in a large enterprise setting. Specifically, the "one size fits all" level of access provided to users assigned to the same role often provides too little access to those users that require additional access or too much data access to those users that should otherwise be restricted from access.

FIG. 2 illustrates some of the various shortcomings of the traditional role based access control model for securing master data or other data within an enterprise setting. As in FIG. 1, user 110 assigned the role of bank manager is provided read and write access to the data object 130 and user 120 assigned the role of financial advisor is provided only read access to the data object 130. However, both the first user 110 and second user 120 may have no need to view or should be restricted from accessing some of the various data instances within the data attributes (i.e., columns) of the accounts object 130.

For instance, assuming that the first user 110 is associated with a New York branch, then there may be no need to expose the account data of the California branch 210 to this user 110. However, the role based access control model does not provide sufficient granular security access control to effectuate such a restriction since the roles configure access permissions to the entire data object 130. Even if access permissions are configured for each data attribute (i.e., column) of the data object, the role based access control model would still provide insufficient access control to restrict a New York branch manager from accessing the account data of the California branch 210 (i.e., individual rows within the columns could not be restricted). As a result, the traditional role based access control model provides such users with access to potentially privileged or confidential data.

To provide the desired level of security through a role based access control model, the system administrator would have to create physically separate data objects or data views within the master data to distinguish the account data of the California branch 210 from the account data of the New York branch. The system administrator would then have to create separate financial advisor roles for the California branch different from financial advisor roles for the New York branch. To do so, creates administrative overhead and creates disjointed data in which data that was once grouped together becomes partitioned across multiple separate data sets with different data objects. Additionally, the different data objects may include data attributes that need to be made available to users in all branches. This creates redundancies in different objects and creates potential data synchronization issues. Therefore, the role based access control model presents a tradeoff between simple security administration and granular security access control.

A policy based access control model is an alternative security model implemented by various enterprises to restrict access to the master data of an enterprise. Unlike role based access control, policy based access control provides any desired level of access control over the data objects, the individual data attributes within each object, or the particular data instances within each data attribute by defining different rules or policies to apply to the different data objects, data attributes, data instances, or users accessing the data.

FIG. 3 presents a policy based access control implementation for controlling access to an accounts data object 340 of an enterprise 350 through a defined set of security policies 310. In this figure, two users 320 and 330 attempt to access data attributes (e.g., customer accounts) of the accounts object 340. The defined security policies 310 specify access rights for each user (e.g., user 320 and user 330). Specifically, three different security access policies are defined for a user that is defined the role of a California bank manager. A first access policy allows a California bank manager to view all accounts in the accounts object 340. A second access policy limits the first access policy by permitting the bank manager access to modify accounts in the state of California. A third access policy restricts the California bank manager from modifying accounts in other states. Similar access policies may exist for bank managers of other states depending on the level of security imposed on such users by the system administrator.

Three particular security access policies are also defined for a user that is defined the role of a California financial advisor. A first access policy is defined to permit a California financial advisor the ability to view all accounts in the state of California. A second access policy is defined to permit the California financial advisor the ability to view and modify accounts in the branch that the financial advisor owns. A third access policy is defined to permit the California financial advisor the ability to view and modify accounts that the financial advisor owns that are outside the state of California.

The traditional policy based access control model thus provides any level of granular security control desired by a security administrator. However, in order to achieve this level of security control, a shortcoming of the policy based access control model is exposed. Namely, the administrative overhead relative to role based access control is greatly increased. As evident in FIG. 3, the system administrator defines multiple security access policies for each single user or data attribute in order to specify the security access control for a single data object. For an enterprise with hundreds of different users, roles, data attributes, or data objects this level of administrative overhead quickly becomes unmanageable.

There is no obvious manner to combine the functionality of a role based access control model with the functionality of a policy based access control model. Policy access controls that are more granular than role based access controls will override the role based access controls when both security access control models are simultaneously applied. Such conflict prevents combining the two approaches for practical applications.

When the policy based access control does not override the role based access controls, the policy based access control conflicts with the role based access controls creating inconsistent access control enforcement. For instance, the role based access control specifies read only access to all data attributes of a data object, whereas the policy based access control specifies read only access to a particular data attribute of the data object, but read and write access to other data attributes of the data object.

Accordingly, there is need in the art for enterprise level security access control that provides sufficient granular control over the master data in the enterprise while minimizing the administrative overhead associated with providing such granular control. Moreover, such access control should be provided without significant cost or significant changes to existing systems, underlying business processes, and underlying business applications of the enterprise.

SUMMARY OF THE INVENTION

Some embodiments provide a method and system for securing access to master data in a multi-user master data management solution. In some such embodiments, the master data is secured by creating secure resources over which security for the master data is administered. A secure resource may include either a logical or virtual secure resource that contains one or more access controls for securing access to data items of the master data or data items of other data resources of an enterprise in which the data management solution functions. In some embodiments, the data items represent data objects that include one or more data attributes with data instances as values for the data attributes. In some embodiments, each data object is one or more related database tables, the data attributes are columns of those tables, and the rows are instances of the data objects. In some embodiments, the secure resources secure access to various rows, columns, data values, or data elements of database tables and data structures that form the data objects of the master data or other enterprise data resources.

In some embodiments, the secure resources are derived based on policy based rules. One or more policy based rules can be used to define a data attribute of a data object as a secure resource. Additionally, one or more policy based rules can be used to define a logical partition of a data object. A logical partition is defined by specifying one or more filters for the logical partition from the policy based rules. In some embodiments, the filters are parameterized using one or more user profile attributes.

Security administrators configure access permissions (i.e., access declarations) for each secure resource (e.g., data attribute or logical partition) and associate the specified access permissions to one or more user roles. In this manner, some embodiments define a secure resource using policy based rules and limit access to the secure resource using role based controls.

Some embodiments then securely control access over the master data by modifying requests (i.e., queries) submitted by a user. In some embodiments, the requests are modified such that the requests are applied to secure resources with corresponding access permissions based on particular roles of the user. Where the secure resource is a logical partition, some embodiments modify the requests to include the one or more user profile attributes of the user required for instantiating the filters associated with the logical partitions identified to be accessible by the user based on the one or more roles assigned to the user. In this manner, some embodiments extend traditional role based access control models to provide granular security access control functionality afforded by policy based access control models.

In some embodiments, secure resources include virtual security objects. The virtual security objects of some embodiments administer security access permissions over data attributes of two or more data objects through a single access permission that is specified for the virtual security object. In this manner, different data attributes of different data objects, irrespective of their hierarchical relationship to one another and irrespective of their physical data object correspondence, are collectively assigned the same set of security access permissions specified for the virtual security object. Therefore, a single point for providing security access control exists for data attributes of two or more different data objects. Some such embodiments provide security administrators the ability to specify more or less security permissions or change security permissions for the virtual security objects.

Some embodiments provide the above described security access control (e.g., the logical partitions or virtual security objects) transparently through a security access management module (i.e., a security access manager) of an enterprise. The security access manager of some embodiments seamlessly integrates with (1) the data applications used by users to submit the requests and (2) the data sources of the enterprise storing the data to be secured. Accordingly, applications are unaware that the security access manager secures the data before exposing the data to the applications. In some such embodiments, the security access manager manages the logical partitions by allowing security administrators the ability to define, configure, and create the logical partitions. Moreover, in some embodiments, the security access manager performs the query manipulation for extending traditional role based access control models to process policy based rules. Similarly, in some embodiments, the security access manager manages the virtual security objects by allowing security administrators the ability to define, configure, and create the virtual security objects. It should be apparent to one of ordinary skill in the art that though the secure resource have thus been described with context to master data, the secure resource are similarly applicable with context to any data resources stored within any data storage of an enterprise.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
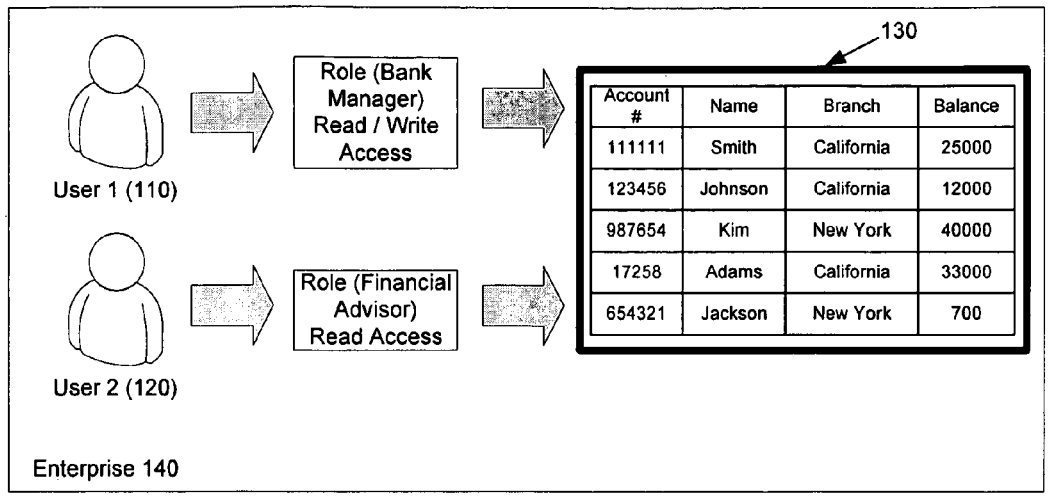
FIG. 1 illustrates securing access to data using the role based access control model.
Figure 2:
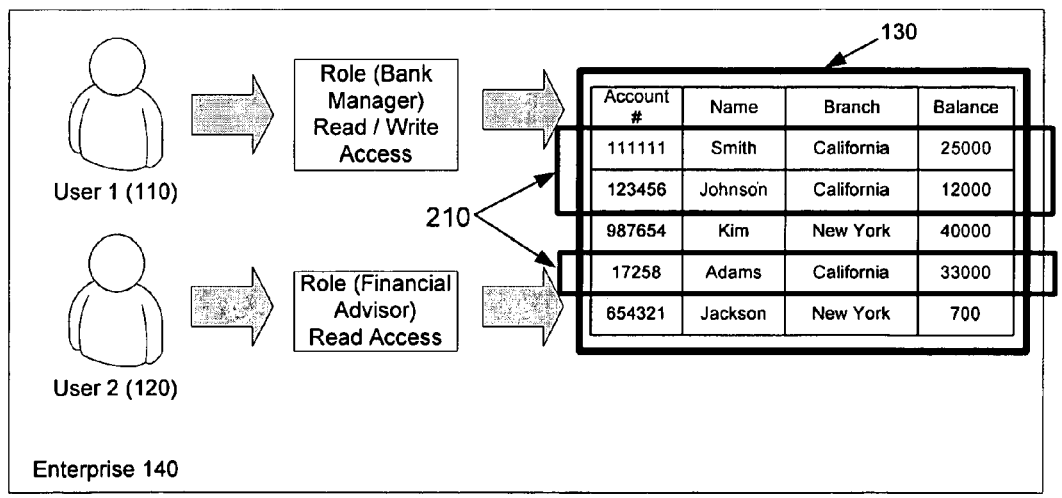
FIG. 2 illustrates some of the various shortcomings of the traditional role based access control model for securing master data or other data within an enterprise setting.
Figure 3:
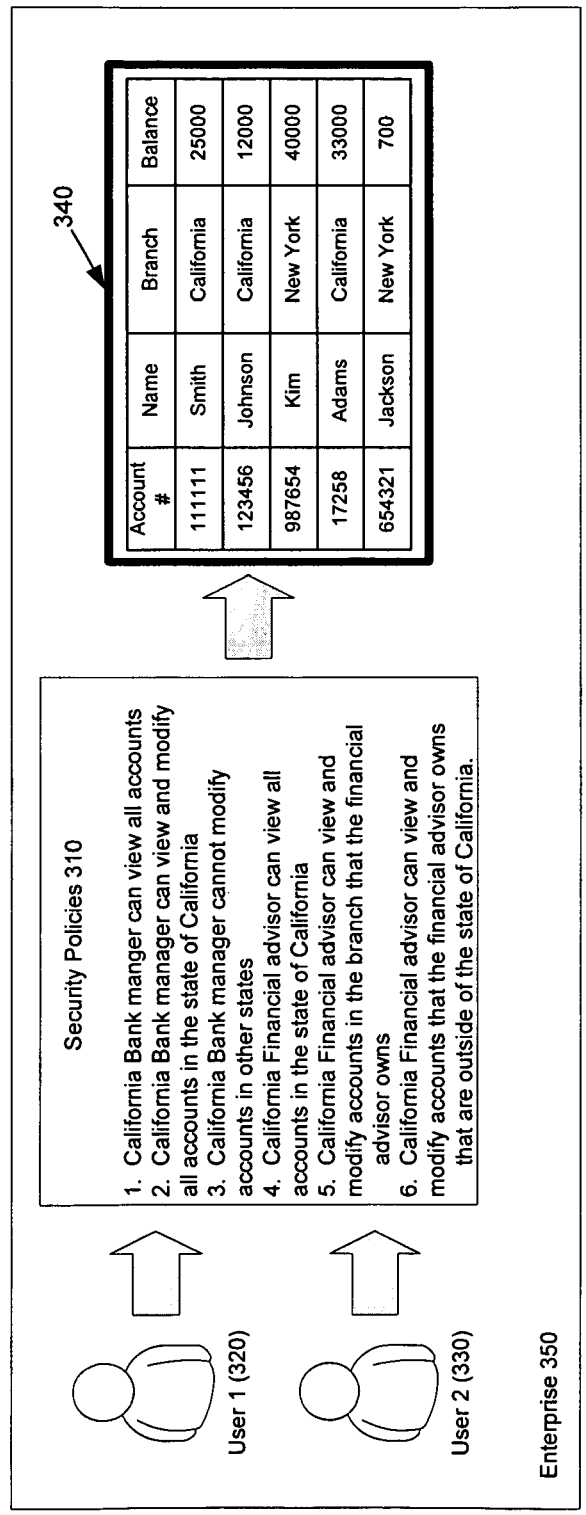
FIG. 3 presents a policy based access control implementation for controlling access to an accounts data object of an enterprise through a defined set of security policies.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

I. Overview

Some embodiments provide a method and system for securing access to master data in a multi-user master data management solution. In some such embodiments, the master data is secured by creating secure resources over which security for the master data is administered. A secure resource may include either a logical or virtual secure resource that contains one or more access controls for securing access to data items of the master data or data items of other data resources of an enterprise in which the data management solution functions. In some embodiments, the data items represent data objects that include one or more data attributes with data instances as values for the data attributes. However, it should be apparent that in some embodiments the data items represent other data resources, data structures, or data groupings of the enterprise. In some embodiments, each data object is one or more related database tables, the data attributes are columns of those tables, and the rows are instances of the data objects. In some embodiments, the secure resources secure access to various rows, columns, data values, or data elements of database tables and data structures that form the data objects of the master data or other enterprise data resources.

In some embodiments, the secure resources are derived based on policy based rules. One or more policy based rules can be used to define a data attribute of a data object as a secure resource. Additionally, one or more policy based rules can be used to define a logical partition of a data object. A logical partition is defined by specifying one or more filters for the logical partition from the policy based rules. In some embodiments, the filters are parameterized using one or more user profile attributes.

Security administrators configure access permissions (i.e., access declarations) for each secure resource (e.g., data attribute or logical partition) and associate the specified access permissions to one or more user roles. In this manner, some embodiments define a secure resource using policy based rules and limit access to the secure resource using role based controls.

Some embodiments then securely control access over the master data by modifying requests (i.e., queries) submitted by a user. In some embodiments, the requests are modified such that the requests are applied to secure resources with corresponding access permissions based on particular roles of the user. Where the secure resource is a logical partition, some embodiments modify the requests to include the one or more user profile attributes of the user required for instantiating the filters associated with the logical partitions identified to be accessible by the user based on the one or more roles assigned to the user. In this manner, some embodiments extend traditional role based access control models to provide granular security access control functionality afforded by policy based access control models.

In some embodiments, secure resources include virtual security objects. The virtual security objects of some embodiments administer security access permissions over data attributes of two or more data objects through a single access permission that is specified for the virtual security object. In this manner, different data attributes of different data objects, irrespective of their hierarchical relationship to one another and irrespective of their physical data object correspondence, are collectively assigned the same set of security access permissions specified for the virtual security object. Therefore, a single point for providing security access control exists for data attributes of two or more different data objects. Some such embodiments provide security administrators the ability to specify more or less security permissions or change security permissions for the virtual security objects.

Some embodiments provide the above described security access control (e.g., the logical partitions or virtual security objects) transparently through a security access management module (i.e., a security access manager) of an enterprise. The security access manager of some embodiments seamlessly integrates with (1) the data applications used by users to submit the requests and (2) the data sources of the enterprise storing the data to be secured. Accordingly, applications are unaware that the security access manager secures the data before exposing the data to the applications. In some such embodiments, the security access manager manages the logical partitions by allowing security administrators the ability to define, configure, and create the logical partitions. Moreover, in some embodiments, the security access manager performs the query manipulation for extending traditional role based access control models to process policy based rules. Similarly, in some embodiments, the security access manager manages the virtual security objects by allowing security administrators the ability to define, configure, and create the virtual security objects. It should be apparent to one of ordinary skill in the art that though the secure resource have thus been described with context to master data, the secure resource are similarly applicable with context to any data resources stored within any data storage of an enterprise.

Several more detailed embodiments of the invention are described in the sections below. Before describing these embodiments further, Section II provides a conceptual architectural diagram of a data management hub containing data resources such as master data sets, data objects, and data attributes where access to such resources are secured by a security access manager of some embodiments. Section III describes the various security access control functionality provided by the security access manager in accordance with some embodiments of the invention. Lastly, Section IV describes a computer system which implements some of the embodiments of the invention.

II. Architecture

Figure 4:
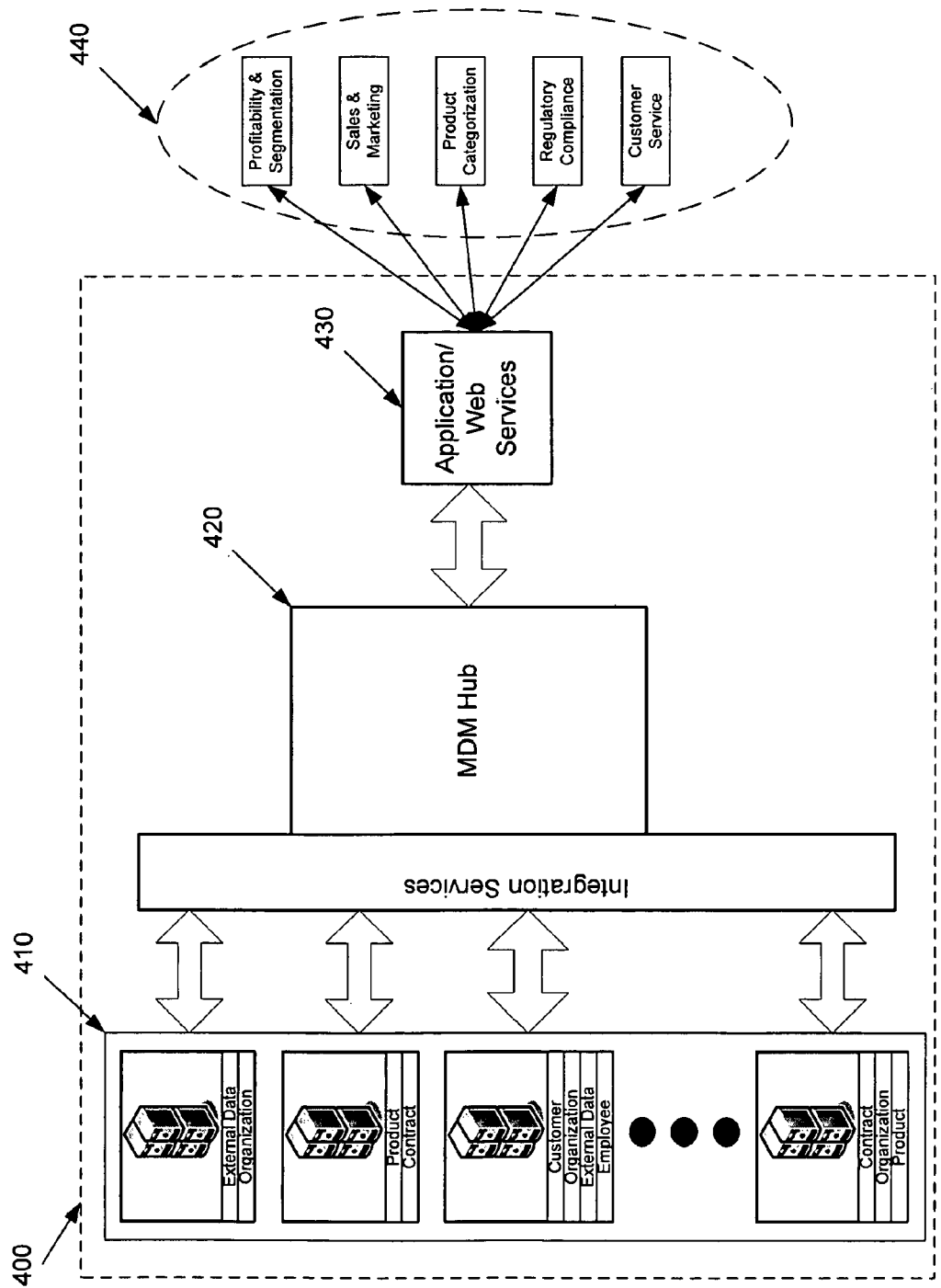
FIG. 4 illustrates a master data management (MDM) hub of an enterprise that implements security access control in accordance with some embodiments of the invention.

FIG. 4 illustrates an enterprise 400 in accordance with some embodiments of the invention. The enterprise 400 includes: (1) multiple data sources 410, (2) a master data management (MDM) hub 420, (3) application/web services 430, and (4) a set of data requestors 440.

The multiple data sources 410 include the various databases, applications, third party tools, data acquisition devices, and data acquisition services that populate and store the enterprise data. Some such data sources are used by users of the enterprise such as billing personnel, marketing personnel, sales personnel, product designers, engineers, managers, etc.

To provide an effective enterprise data integration solution, some embodiments use the MDM hub 420 to consolidate the common master data entities from the data sources 410 in order to facilitate the integration across them. The MDM hub 420 is seamlessly integrated into the enterprise 400 in a manner that requires little to no modification to the existing resources or interfaces of the enterprise. In some embodiments, the seamless integration of the MDM hub 420 occurs in context of an enterprise service bus that provides the communication pathway for the messaging exchanged within the enterprise. By interfacing with the enterprise service bus, the MDM hub 420 is able to monitor and secure some or all such messaging without directly interfacing with either the source or destination node submitting the message as described in further detail below.

Once integrated, the MDM hub 420 enables enterprises to eliminate data discrepancies across disparate data sources and applications, and to integrate their core business entity data into key business processes. The MDM hub 420 facilitates such functionality by creating at least one master data set. The data for the master data set is distributed across many operational systems, analytical systems, and data sources 410 of the enterprise. The MDM hub 420 creates the master data set using data collected from these system and data sources 410. The master data set may include a single data set that is shared between the data sources 410 and other entities 440 that require access to the enterprise data. The master data set is used to provide the context for other enterprise data. In some embodiments, the master data set is a logical data set that links to the physical data objects within each of the data sources 410. In some other embodiments, the master data set is a physical data object that pieces data together from each of the multiple data sources 410.

The MDM hub 420 receives requests through the application/web services 430 of the enterprise 400. Several different data requestors 440 utilize the application/web services in order to issue the requests. The data requestors 440 may include users within the enterprise such as customer service personnel, sales personnel, marketing personnel, etc. Additionally, the data requestors 440 may include entities outside the enterprise such as governmental agencies that verify whether the enterprise adheres to regulatory requirements. It should also be apparent to one of ordinary skill in the art that requests may originate from a first data source 410 of the enterprise 400 seeking data from a second data source 410 of the enterprise 400.

In some embodiments, the MDM hub 420 includes a security access management (SAM) module (i.e., security access manager) to provide the security access control functionality (e.g., authentication, authorization, etc.) for the MDM hub 420. In some embodiments, the SAM enforces security access control for secure resources that are managed by the MDM hub as well as other enterprise data resources that are accessed through the MDM hub's federated views. In some embodiments, the secure resources secure access to some or all of the master reference data, activity data, relationship data, etc. In some embodiments, the secure resources include physical resources, logical partitions, and virtual secure objects as described in further detail below in Section III.

Such functionality allows the MDM hub 420 to ensure that security rules enforced by the data sources, in regards to access to the master data entities, can be replicated in the MDM hub 420. For example, if a first user in System A has access to a subset of customer data as furnished by a data service A1 provided by the System A, the MDM hub 420 is capable of replicating such restrictions when a request from the first user is executed against the MDM hub 420. In some embodiments, the MDM hub 420 provides additional functionality such as delta detection (e.g., detecting change in data) and data cleansing (e.g., name correction, address standardization, data transformations, etc).

Figure 5:
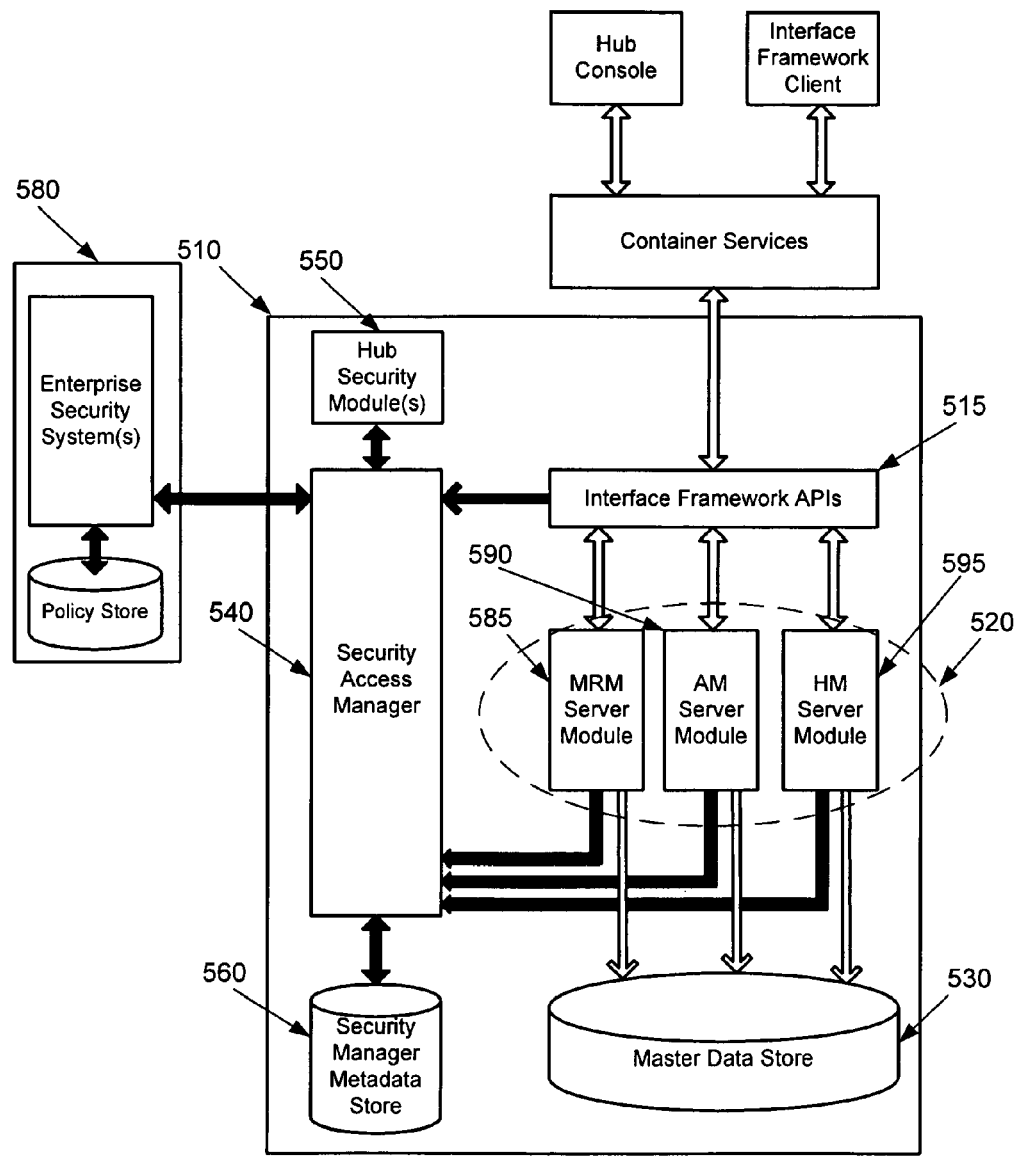
FIG. 5 presents a more detailed illustration of the MDM hub of some embodiments.

FIG. 5 presents a detailed illustration of one such MDM hub 510 in accordance with some embodiments of the invention. In this figure, the MDM hub 510 includes the following components: (1) an interface framework 515, (2) various server modules 520, (3) a master data store 530, (4) the security access management (SAM) module 540, (5) one or more hub security modules 550, and (6) a security manager metadata store 560.

The interface framework 515 establishes the interfaces for executing operations against the MDM hub 510. To do so, the interface framework 515 operates in conjunction with user applications and other authentication and authorization applications. The operations requests that are delivered through the interface framework 515 are fulfilled by one of the server modules 520 of the MDM hub 510.

FIG. 5 illustrates three such server modules 520: a master reference manager (MRM) 585, activity manager (AM) 590, and hierarchy manager (HM) 595. The master reference manager 585 manages reference data or data that identifies an entity. The activity manager 590 facilitates access to the transactional data or data related to the interaction of the entity stored in the external enterprise systems. In addition, the hierarchy manager 595 manages data that expresses a relationship that the entity has one or more other entities. Together these modules facilitate the logic for creating and accessing various different types of data whether they are stored in the master data store 530 or distributed across the different data storages of the enterprise.

In some embodiments, the SAM 540 leverages the security functionality of one or more enterprise security systems 580 and/or one or more hub security modules 550 to provide some or all the security access control functionality for the enterprise resources and/or users. In some embodiments, the hub security modules 550 are part of a particular application server technology such as WebSphere®, WebLogic®, or JBoss® in which the MDM hub 510 is implemented. Each of the security systems 580 or 550 may provide different levels of security functionality in a security hierarchy for all or a subset of resources and/or users. For instance, the SAM 540 may leverage functionality of a first hub security module 550 to perform a first level of authentication for the MDM hub 510 and then leverage functionality of a first enterprise security system 580 to perform a second level of authentication for the MDM hub 510 if necessary. Such may be the case in an enterprise that allows different logins where a first login may include a username and password and a second login may include an email address and identification number.

The security manager metadata store 560 stores the metadata for security control. In some embodiments, the security manager metadata store 560 stores user data such as username and password used for user authentication. In some embodiments, the security manager metadata store 560 stores other user profile attributes used in conjunction with the various roles and/or security policies defined for the users accessing the secured enterprise resources.

III. Security Access Manager

Figure 6:
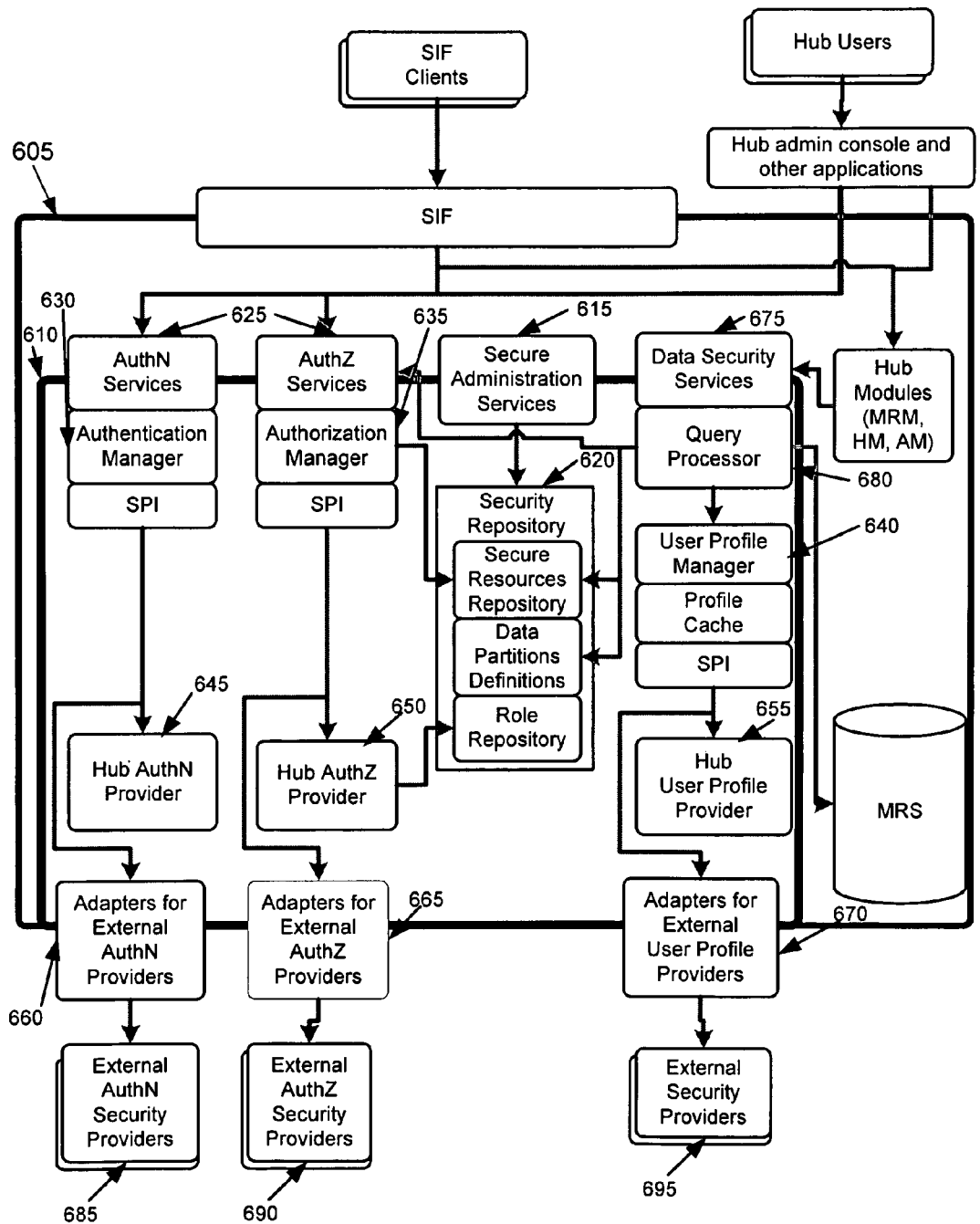
FIG. 6 presents a more detailed illustration of the SAM and its interworking with various plug-ins to provide the flexible framework that configurably performs security functionality for an enterprise.

FIG. 6 presents a more detailed illustration of the SAM and its interworking with various plug-ins to provide the flexible framework that configurably performs security functionality over a set of secure resources. The SAM 610, as shown in the context of a data management hub 605 (e.g., MDM hub), includes: (1) secure administration services 615, (2) a security repository 620, (3) various authentication and authorization services 625, (4) configurable management modules 630-640, (5) plug-in modules 645-670, (6) data security services 675, and (7) a query processor 680.

The secure administration services 615 provide the one or more interfaces for performing security administration over the secure resources managed by the SAM 610. These services 615 and the corresponding interfaces allow system administrators the ability to define, configure, and create secure resources such as the logical partitions and the virtual security objects described in further detail below.

Once created, the secure resources are stored within the security repository 620. The security repository 620 includes a secure resources repository, definitions for the logical data partitions, and a role repository. In some embodiments, the definitions for the logical data partitions store policy based rules and the role repository stores role based access control declarations that are associated with the logical data partitions, both of which are used to facilitate the extended role based access model of some embodiments.

In some embodiments, the SAM 610 performs various security operations within a security hierarchy. Different service modules (e.g., authentication services and authorization services 625) provide the interfaces into the SAM 610 for processing these and other runtime security operations. Each interface includes a configurable management module 630-640.

Each configurable management module 630-640 includes a system provider interface (SPI) that establishes a communication pathway between the particular management module and one or more plug-ins 645-670 of the SAM 610. The plug-ins 645-655 are hub internal security systems and the plug-ins 660-670 are adapters to external enterprise security systems 685-695.

In some embodiments, the SAM 610 can be configured to interwork with these security systems 645-655 or 685-695. Specifically, each management module 630-640 of the SAM 610 can be configured to manage the processing of one or more levels or sets of security operations within the security hierarchy by leveraging the security functionality provided by some or all such security systems 645-655 or 685-695. In this figure, the management module 630 is configured as an authentication manager that facilitates authentication services for the SAM, the management module 635 is configured as an authorization manager that facilitates authorization services for the SAM, and the management module 640 is configured as a profile manager that manages user profiles.

In some embodiments, configuring a particular management module involves specifying a hierarchical ordering by which to perform one or more security operations using one or more security systems. For instance, a particular management module may be configured to operate with first and second authentication providing security systems. Therefore, the particular management module may be configured so that authentication requests are first submitted to the first authentication providing security system, then if authentication cannot be completed by the first authentication providing security system, the particular management module submits the authentication requests to be performed by the second authentication security system. Configuring the management module therefore also includes configuring the management of the distribution of the requests and the management of the responses received from each plug-in.

In some embodiments, the adapter plug-ins 660-670 permit the SAM 610 to communicate with and leverage the security functionality provided by any number of external security systems. The adapters 660-670 convert the individual interfaces, protocols, and messages used by the various security systems to interfaces, protocols, and messages that are compatible with the SAM 610. Accordingly, the SAM 610 may initially support some set of security systems, but by using one or more adapters, the SAM is scalable to support a much larger set of security systems. In this manner, the SAM 610, through its various management modules 630-640, provides a single point within the enterprise whereby all security control for the enterprise is managed.

The SAM of some embodiments includes a mechanism by which to register the various types of plug-ins. Additionally, the SAM will resolve conflicts that may occur between the functionality of different plug-ins and different management modules. The SAM facilitates deploying the functionality of each plug-in module without incurring downtime to existing services and modules. For example, an existing authentication services module of the enterprise may operate while a new enterprise security system that provides authentication services is configured. Once the enterprise security system is configured and tested, the SAM activates the enterprise security system which then takes over the authentication services from the existing authentication module. Similarly, maintenance may be performed to existing security systems by disabling the functionality of such systems when performing the upgrade. In some embodiments, the SAM disables the functionality of a security system by configuring a management module to divert the security requests to one or more other security systems. Once the maintenance is complete, the SAM can then reconfigure the management module to bring the disabled security system back online.

In some embodiments, the data security services 675 provide the security interface for securing user queries against the secure resources. Specifically, users submitting queries to access data resources of the hub will be intercepted and processed by the SAM before execution over the data resources of the hub. The intercepted queries are passed to the query processor 680. In some embodiments, the query processor 680 modifies the queries such that the queries are performed over the secure resources defined for the enterprise. In some such embodiments, the query processor 680 modifies the queries to implement policy based security access controls defined within the data partitions definitions of the security repository 620. These policies are identified based on user roles within the role repository of the security repository 620.

In this manner, the query processor 680 compliments a role based access control engine to facilitate the extended role based security access control model further described below in Subsection A.

As noted above, the SAM of some embodiments flexibly adapts to deploy security functionality of one or more enterprise security systems or hub security systems to provide different levels of security functionality in the context of the enterprise. FIGS. 7-10 illustrate various levels of integration of these security systems operating with the SAM in accordance with some embodiments of the invention.

Figure 7:
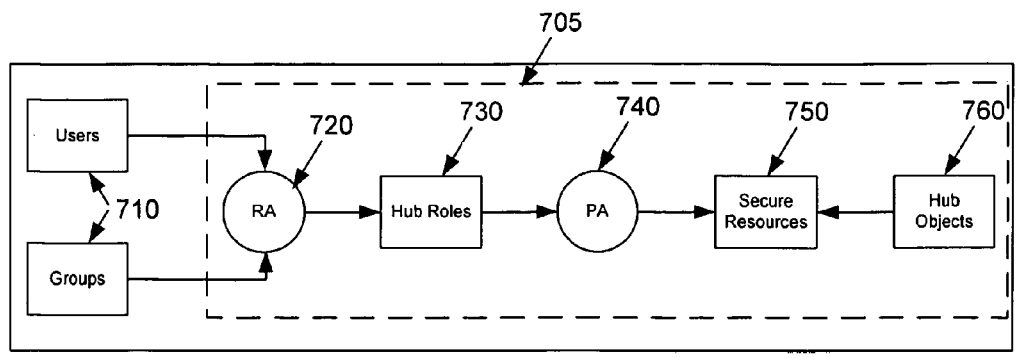
FIG. 7 illustrates a first level of integration of external security providers operating within the enterprise and the security access manager (SAM) in accordance with some embodiments of the invention.

In FIG. 7, all policy decisions are made internally and all security controls are implemented internally within the MDM hub 705. Therefore, the role assignment process 720 for users and groups 710 is performed by the SAM in conjunction with one or more hub security systems and the internally defined set of roles 730. The SAM also performs the permissions assignment process 740 using one or more hub security systems. Through these processes, the SAM of some embodiments determines the access rights that users with particular roles have to the secure resources 750 that are derived from the hub objects 760.

Figure 8:
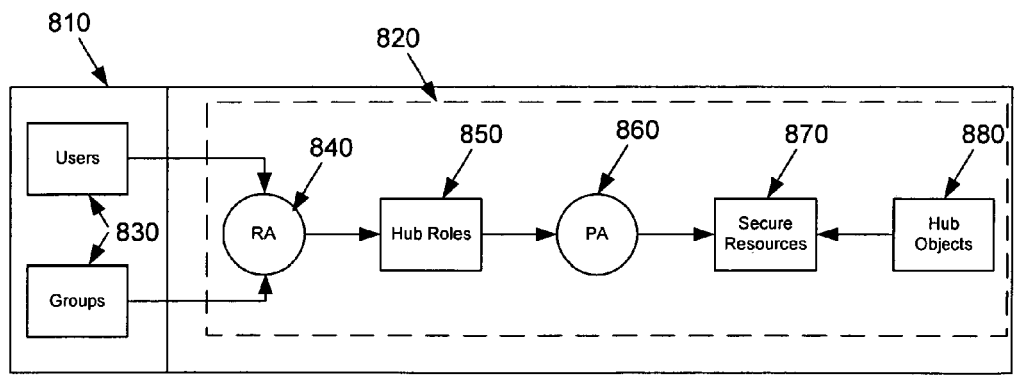
FIG. 8 illustrates a second level of integration of external security providers operating within the enterprise and the SAM in accordance with some embodiments of the invention.

In FIG. 8, one or more enterprise security systems 810 operating in conjunction with the SAM of the MDM hub 820 perform the user and group administration 830 externally from the MDM hub 820. The SAM performs the role administration process 840 for the external security provider using the defined roles 850 and the general permissions assignment process 860 using one or more hub security systems. Additionally, the SAM performs the management and access control for the secure resources 870 that are derived from the hub objects 880.

Figure 9:
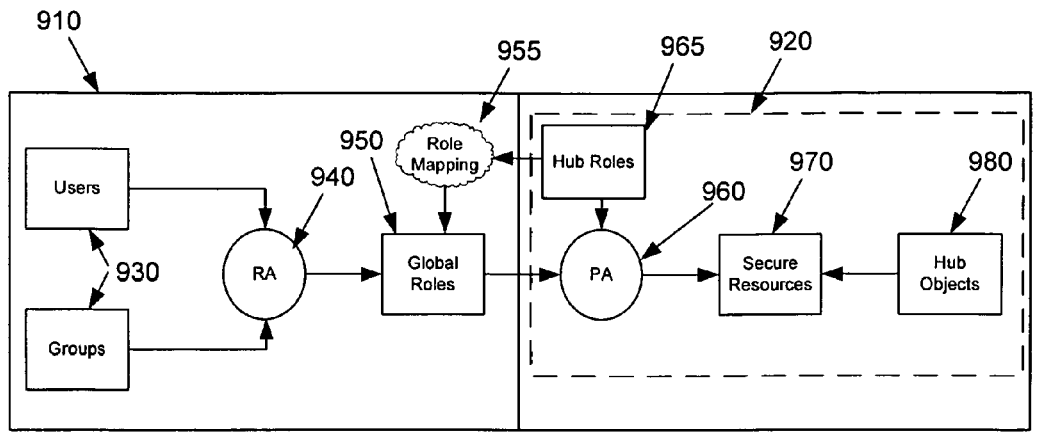
FIG. 9 illustrates a third level of integration of external security providers operating within the enterprise and the SAM in accordance with some embodiments of the invention.

FIG. 9 illustrates an alternative integration model for one or more enterprise security systems with the SAM of some embodiments. In this figure, the one or more enterprise security systems 910 administer the users and groups 930 and perform the role assignment process 940 externally from the hub 920. Since the SAM performs the security access control and manages the secure resources and data objects of the hub 920, the SAM includes an adapter for role mapping 955 for synchronizing with and accessing the role assignments defined by the enterprise security systems 910. In FIG. 9, the SAM manages the general permissions assignment 960 in conjunction with one or more hub security systems. The SAM also provides the security control over the secure resources 970 that are derived from the hub objects 980.

Figure 10:
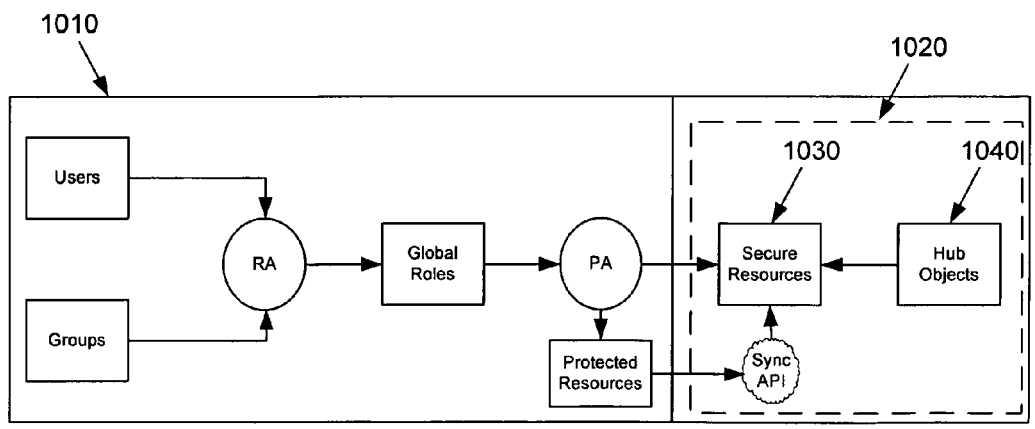
FIG. 10 illustrates a fourth level of integration of external security providers operating within the enterprise and the SAM in accordance with some embodiments of the invention.

FIG. 10 illustrates an integration model where the role assignments and policy assignments for securing the data are managed by one or more enterprise security systems 1010 external to the hub 1020. However, the SAM of the hub 1020 maintains control over and secures access to the secure resources 1030 that are derived from the hub objects 1040 by enforcing the externally defined role and policies. It should be apparent to one of ordinary skill in the art that alternative integration models are further possible.

A. Role Based Access Control Extensions for Managing Data Security

In some embodiments, the logical partitions are used in conjunction with an extended role based access control model that provides more granular security access control than traditional role based access control models. The extended role based access control model of some embodiments provides for the more granular security access control by adapting rule based policy controls to operate in conjunction with a role based access control security model.

Figure 11:
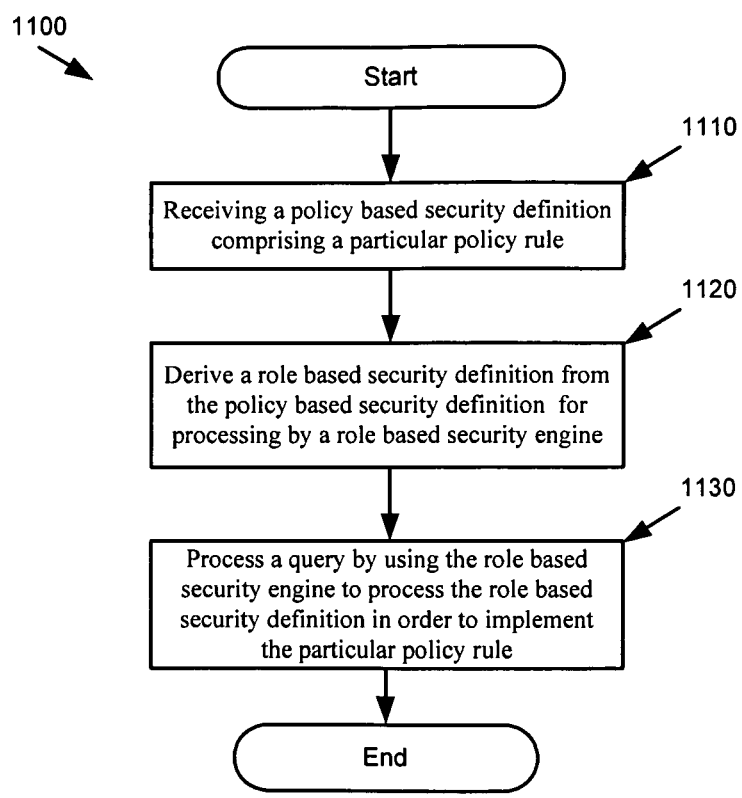
FIG. 11 presents a process for implementing the extended role based access control in accordance with some embodiments of the invention.

FIG. 11 presents a process 1100 for implementing the extended role based access control in accordance with some embodiments of the invention. The process 1100 begins by receiving (at 1110) multiple policy based security definitions or rules that restrict user access to data attributes or data objects of an enterprise. In some embodiments, these policy based security definitions are defined by one or more security administrators.

The process derives (at 1120) role based security definitions from the policy based security definitions such that the policy based security definitions may be processed by a role based access control engine. In some embodiments, deriving the role based security definitions from the policy based security definitions involves creating one or more secure resources based on the policy based security definitions and configuring role based access control declarations to the secure resources to define which users have what access to the secure resources based on their assigned role or roles. The secure resources include data attributes of data objects or logical partitions of the data objects. In some embodiments, the logical partitions specify one or more filters that implement the policy based rules. The logical partitions are then registered as secure resources that are used to facilitate granular access to the data attributes of the physical data objects stored within the enterprise.

In some embodiments, the SAM acts as a front-end to a role based access control engine of an enterprise and the SAM produces the logical partitions that are necessary to adapt the policy based rules to existing role based access controls. In some other embodiments, the SAM performs the conversion and acts as the role based access control engine for the enterprise.

When a user query is performed, the process defines access to the data attributes of the data objects using a role based access control model. Specifically, some embodiments process (at 1130) a query by using the role based security engine to process the role based security definition in order to implement the policy rules. For instance, some embodiments utilize user assigned roles to identify the one or more secure resources associated with the assigned roles. The identified secure resources are then used to modify a user query such that the user query is restricted based on the policy based rules used to derive the secure resources. In some embodiments, the logical partition secure resources are used in conjunction with other secure resources that expose various data attributes or data objects as secure resources. Accordingly, a user query may be modified to restrict user access to specified data attributes of a data object and a set of filters associated with a logical partition secure resource may be used to further restrict the user to specific data instances within these data attributes.

Figure 12:
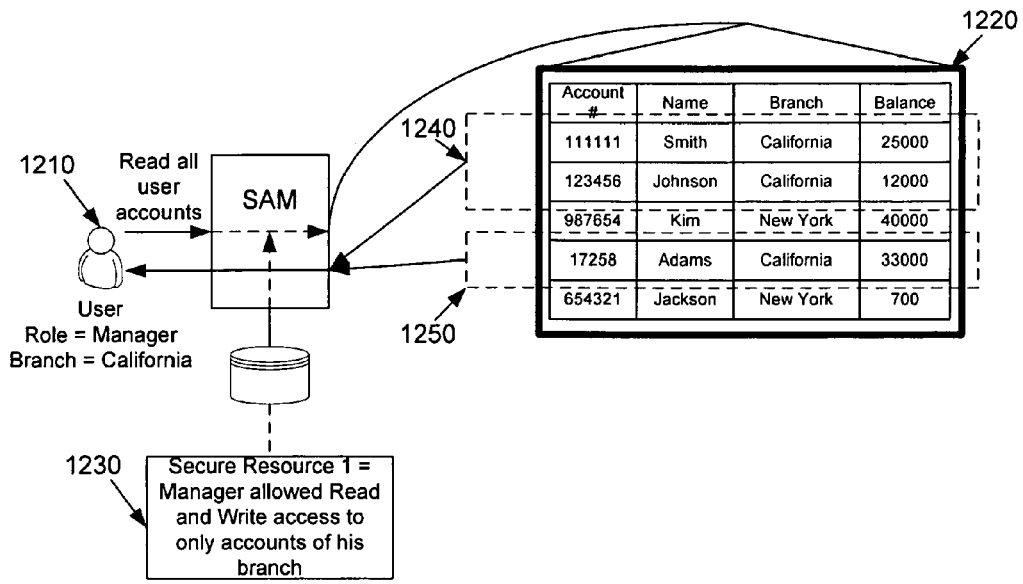
FIG. 12 illustrates using filters of a logical partition to provide more granular role based security access control.

FIG. 12 illustrates using filters of a logical partition to provide more granular role based security access control. In this figure, a user 1210 is assigned the role of a manager. The user 1210 submits a query that requests "read all user accounts" associated with an accounts object 1220. Based on the user role (i.e., manager), a secure resource 1230 is identified. The secure resource 1230 specifies a logical partition of the account 1220 through a set of filters that were defined using one or more policy security definitions. The filters restrict managers to read and write access to only accounts of their branch.

The query is then modified to include the policy security definitions of the logical partition 1230 by instantiating the filters of the secure resource 1230 with one or more user profile attributes. In this instance, the user's branch attribute is needed to instantiate the filter. Accordingly, when the modified query is performed, the policy security definition acts as a filter that limits the user to read and write access to only California accounts within the accounts object. Accordingly, only the rows 1240 and 1250 are returned in response to the user query.

Figure 13:
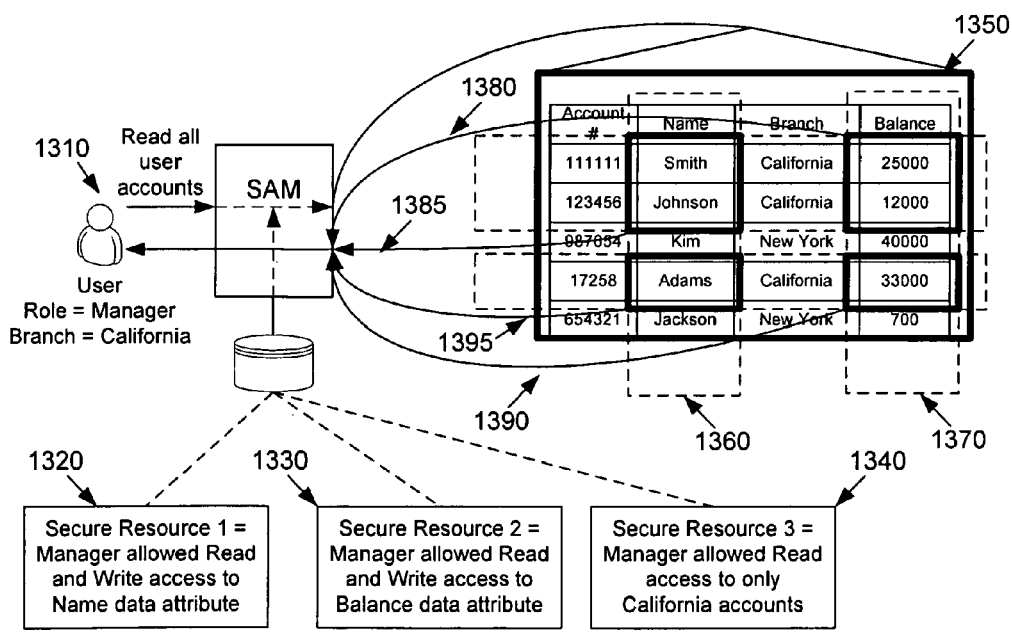
FIG. 13 illustrates providing even more granular role based security access control by defining data attributes as additional secure resources to be used in conjunction with the logical partition.

FIG. 13 illustrates providing even more granular role based security access control by defining data attributes of a data object as additional secure resources to be used in conjunction with a logical partition secure resource. In this figure, a user 1310 is also assigned the role of a manager. The user 1310 submits the same query requesting "read all user accounts". Based on the user role (i.e., manager), multiple secure resources are identified: a first secure resource 1320 provides a manager with read and write access to the name data attribute of the accounts object 1350, a second secure resource 1330 provides a manager with read and write access to the balance data attribute of the accounts object, and a third secure resource 1340 identifies a logical partition secure resource with a filter that restricts managers to read access to only accounts of their branch.

As before, the query is modified to include the instantiated filter of the third secure resource 1340, however the modified query also includes additional parameters that limit the query to only data attributes 1360 and 1370 of the accounts object 1350 as defined by the secure resources 1320 and 1330. Accordingly, the query results return only a subset of the data attributes 1380-1395 of the data object 1350.

Figure 14:
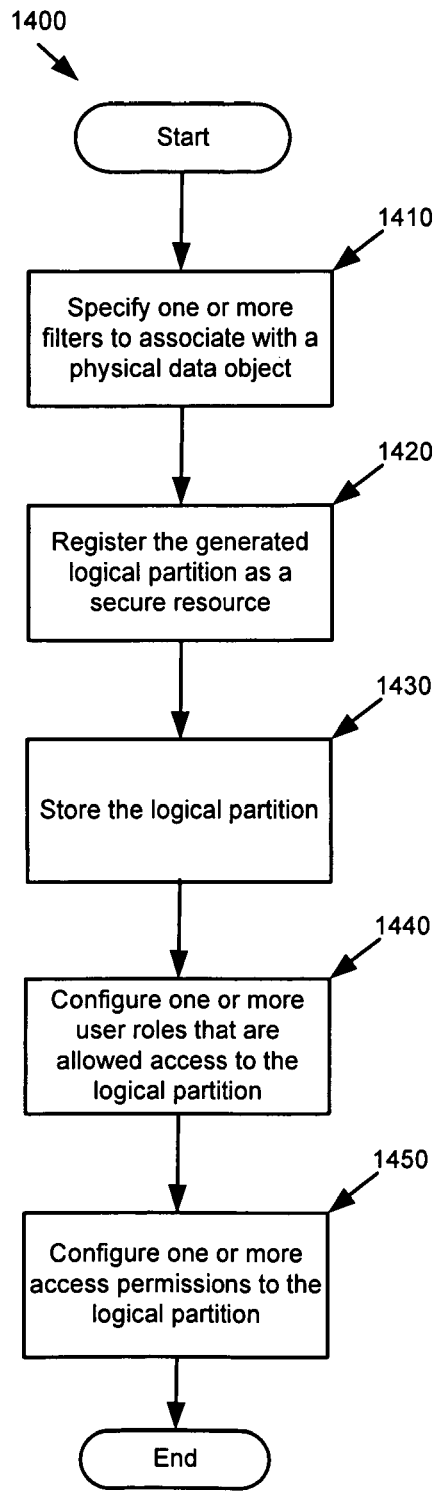
FIG. 14 presents a process for defining a logical partition in accordance with the extended role based access control model of some embodiments.

As noted above, a logical partition specifies a secure resource that includes one or more filters that are defined from policy based rules and access to the secure resource is specified using role based controls. FIG. 14 presents a process 1400 for defining a logical partition in accordance with the extended role based access control model of some embodiments. The process 1400 begins when a security administrator specifies (at 1410) a logical partition through a set of filters and the logical partition is associated with one or more physical data objects. In some embodiments, a graphical interface is presented through which the administrator (1) specifies the filters for the logical partition and (2) identifies the physical data objects to which the filters apply. For example, an administrator drags and drops graphical representations for the specified filters onto a graphical representation representing the physical data object in order to create a logical partition. However, it should be apparent that in some embodiments administrators use other means to specify the roles and data partitions such as a command line interface or scripting interface.

In some embodiments, the filters define policy based rules that are parameterized using one or more user profile attributes. In some embodiments, the user profile attributes include names, identification numbers, titles, roles, user location, user affiliations, or any other piece of information related to the profile of the user.

The process then registers (at 1420) and stores (at 1430) the logical partition as a secure resource. The process further permits the administrator to configure (at 1440) one or more user roles or other user profile attributes that will be allowed access to the registered logical partition. Additionally, the process permits the administrator to define (at 1450) one or more access permissions to restrict access to each logical partition based on the associated role or other user profile attribute configured at 1440. It should be apparent to one of ordinary skill in the art that steps 1440 and 1450 may be optional and that default values may be assigned when creating the logical partition.

The following provides two examples for defining filters and configuring access permissions for two separate logical data partitions in accordance with some embodiments:

| Logical_Partition_X: | Logical_Partition_Y: |
|---|---|
| Filters: | Filters: |
|   User.affiliation |   User.ID# |
|   User.branch | |
| Data Object: | Data Object: |
|   Object_X |   Object_Y |
| |   Object_Z |
| Roles: | Roles: |
|   Manager & Financial Advisor (FA) |   Manager |
| Rights: | Rights: |
|   Read Access |   Read Access |

In the above examples, Logical_Partition_X is accessible to users assigned the roles of a Manager or a Financial Advisor while Logical_Partition_Y is only accessible to users assigned the role of a Manager. Logical_Partition_X contains two filters based on affiliation and branch user profile attributes that filter data attributes of Object_X. Logical_Partition_Y includes only one filter based on an identification number user profile attribute that filters data attributes of Object_Y and Object_Z. Additionally, only read access is provided to those users assigned the above enumerated roles with access to Logical_Partition_X and Logical_Partition_Y. Specifically, a user with the role of a financial advisor will be allowed read access only to the data attributes of Object_X that relate to the user's affiliation and branch. For instance, if Object_X includes accounts from New York and California, and the user works in a California branch, then the parameterized filters of Logical_Partition_X will restrict the user to have read only access to the California account of Object_X. The user is restricted from all other data attributes of Object_X and all other objects.

Figure 15:
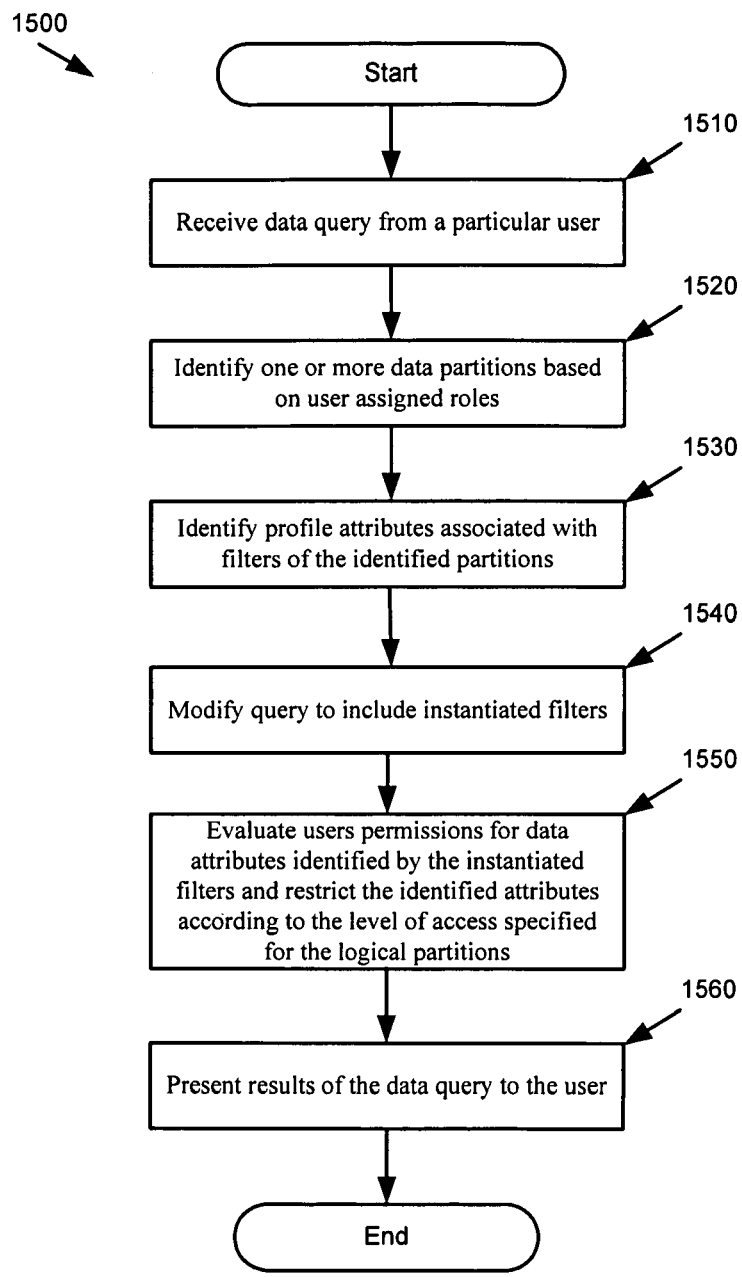
FIG. 15 presents a process for implementing the extended role based access control model of some embodiments for facilitating data access control to a data object via one or more logical partitions of the data object.

FIG. 15 presents a process 1500 for implementing the extended role based access control model of some embodiments for facilitating data access control to a data object via one or more logical partitions of the data object. The process 1500 begins by receiving (at 1510) a query from a particular user using one of many applications that access master data or other data of an enterprise.

The process identifies (at 1520) one or more logical data partitions that the user has access to based on one or more user profile attributes in the user's profile. Specifically, in some embodiments, the one or more roles assigned to the user are used as the user profile attributes that identify (at 1520) the logical partitions. In some embodiments, user assigned roles contain hierarchical relationships with one another such that a child user role may be allowed to access all the logical partitions permitted to be accessed by a parent user role in addition to one or more other logical partitions permitted to be accessed by the child user role.

In some embodiments, the logical data partitions are predefined such that for one or more user profile attributes the logical partitions already exist within the SAM. In some other embodiments, the logical partitions are dynamically created based on (1) received queries and (2) one or more user profile attributes.

The identified logical partitions include one or more filters that form policy based rules limiting data attributes accessible in any given data object associated with the logical partition. As noted above, the filters are determined based on one or more user profile attributes. Therefore, the process identifies (at 1530) the one or more user profile attributes that are required to instantiate the filters associated with the identified logical partitions.

The process then modifies the user query (at 1540) to include the instantiated filters (i.e., associate the identified user profile attributes to the filters). The process then evaluates (at 1550) users permissions on the data attributes of the data objects and restricts the attributes available for the operation according to the level of access required for the operation and user rights (i.e., access rights defined for the logical partition based on the user role). In this manner, the query is performed only over secure resources (e.g., logical partitions and other exposed data attributes or data objects) of the enterprise.

The results are then presented (at 1560) to the user through a graphical interface or other electronic means. Some embodiments can restrict subsets of data attributes of one or more data objects based on policy based rules where the access declarations and management over the subsets of data attributes are performed according to user roles.

Also as noted above, logical partitions can be used in conjunction with other secure resources to specify different levels of granular security access control in a role based model. In some embodiments, the secure resources include individual data attributes of the data objects for which role based access controls may be configured. Therefore, when modifying the query at step 1540 above, the process further modifies the query to include parameters that restrict the query to accessing only specified data attributes of a data object designated as secure resources.

For example, if a first secure resource associated with a manager role specifies providing only read access to a balance data attribute of an accounts object and a second secure resource associated with a manager role specifies providing only read access to accounts of the user branch in the accounts object, then when a user assigned the role of a manager who is associated with the California branch submits a query the query will be modified as follows:

(1) Original Query: Read all accounts
(2) Query modified based on the first secure resource: Read only the balance data attribute for all accounts
(3) Query modified based on the first and second secure resources=Read only the balance data attribute for all California accounts In a table abstraction of a data object, this combination of secure resources allows a security administrator to restrict access to any row, column, or combination of rows and columns of the data object through a role based access control model.

Figure 16:
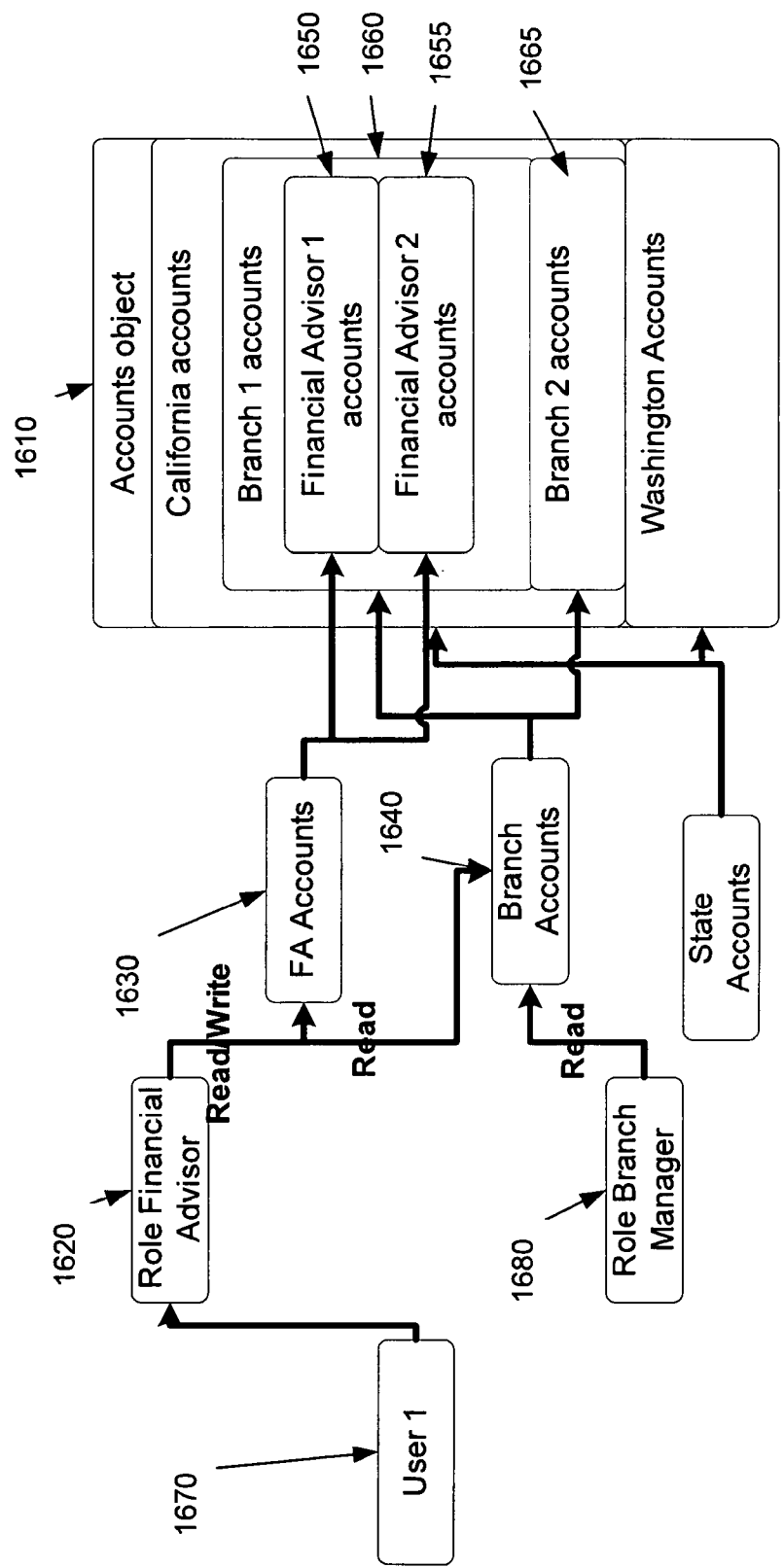
FIG. 16 illustrates extending role based access control in accordance with some embodiments of the invention in order to provide more granular security access control without the additional overhead required for such control in policy based security control models.

FIG. 16 illustrates logical partitions of a data object as secure resources used by some embodiments of the SAM to facilitate data access control to the data object via the extended role based access control model. In this figure, physical data object 1610 is secured by performing security access control over the logical data partitions 1630 and 1640 instead of the data object 1610.

The partitions 1630 and 1640 are derived from the data attributes that form the datasets 1650-1665 of the data object 1610. Specifically, the partition 1630 maps to the datasets 1650 and 1655 and the partition 1640 maps to the datasets 1660 and 1665. The mapping of the datasets 1650-1665 to the partitions is logical. In some embodiments, the partitions 1630 and 1640 are logical partitions in the sense that they exist without modification to the data object 1610 and without instantiation of additional physical data objects to store the data attributes of the logical partitions 1630 and 1640.

In some embodiments, the logical mapping of the datasets 1650-1665 to the partitions 1630 and 1640 is based on one or more filters that may be parameterized with one or more attributes from the user profile of the user requesting access to the secure resources. For instance, a filter may be defined using a standardized query language (SQL) condition clause that is applied to an object table or a directly related table (i.e., one level of indirection).

In FIG. 16, a user role profile attribute is used to identify the logical partitions 1630 and 1640 by which the user is provided secure access to the data attributes of the data object 1610. For user 1670 in a financial advisor role, the SAM will instantiate the filters for partitions 1630 and 1640 only, but not any other logical partitions because of the role assigned to user 1670. The SAM evaluates the parameters of the data partitions and determines that it requires the user's branch affiliation and the user ID in order to construct and execute the filters for partitions 1630 and 1640 that identify the data set that the requested operation can be performed on. In other words, the user's branch affiliation is used to define a policy based rule that creates the partition 1640 and the user ID is used to define a policy based rule that creates the partition 1630.

The SAM then modifies the queries issued by the user to include the filters. This ensures that the filters of the partitions 1630 and 1640 are consistently applied to all data access queries in processing of the user request based on the level of access required by the operation. Each of the user requests (i.e., queries) are then subsequently performed only on the partitions that the user has assigned access rights to. In this manner, the SAM restricts the amount of data from the data object 1610 that any one particular requestor is able to access at any given time. The requestor is thus prevented from accidentally viewing, modifying, or corrupting unprivileged information.

For a write operation requested by user 1670, the SAM identifies the logical partition 1630 as the only partition that the user 1670 has write access to. The SAM then renders the filters associated with that data partition in the manner described in the above paragraph.

Several advantages result from this manner of security administration over the logical secure resources 1630 and 1640: (1) the logical secure resources 1630 and 1640 need not include all the data rows that are part of the physical data object 1610, (2) the logical secure resources 1630 and 1640 need not be created as physical data objects that consume storage and that create data redundancies within the data storages of the enterprise, and (3) the logical secure resources 1630 and 1640 provide better granularity for defining security access rules. In this manner, some embodiments are able to flexibly restrict the data that is accessible to the user using policy based rules while still maintaining the low administration overhead (e.g., secure resource declaration assignment) associated with traditional role based access control models. In other words, some embodiments are able to emulate attribute level or policy based access control in conjunction with a role based access control model that uses the logical data partitions.

Figure 17:
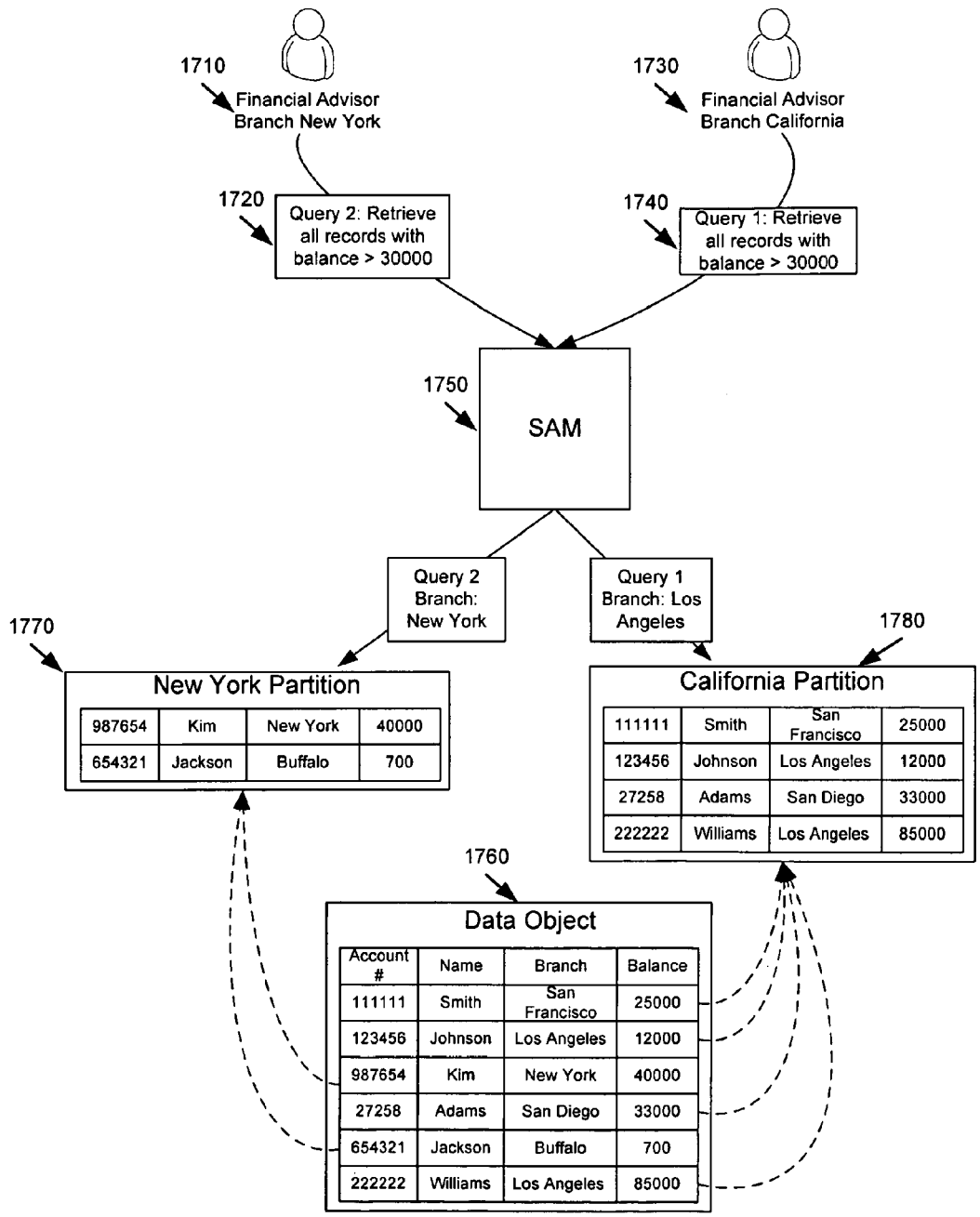
FIG. 17 presents a first user submitting a first data request and a second user submitting a second data request to a SAM providing extended role based access control in accordance with some embodiments.
Figure 18:
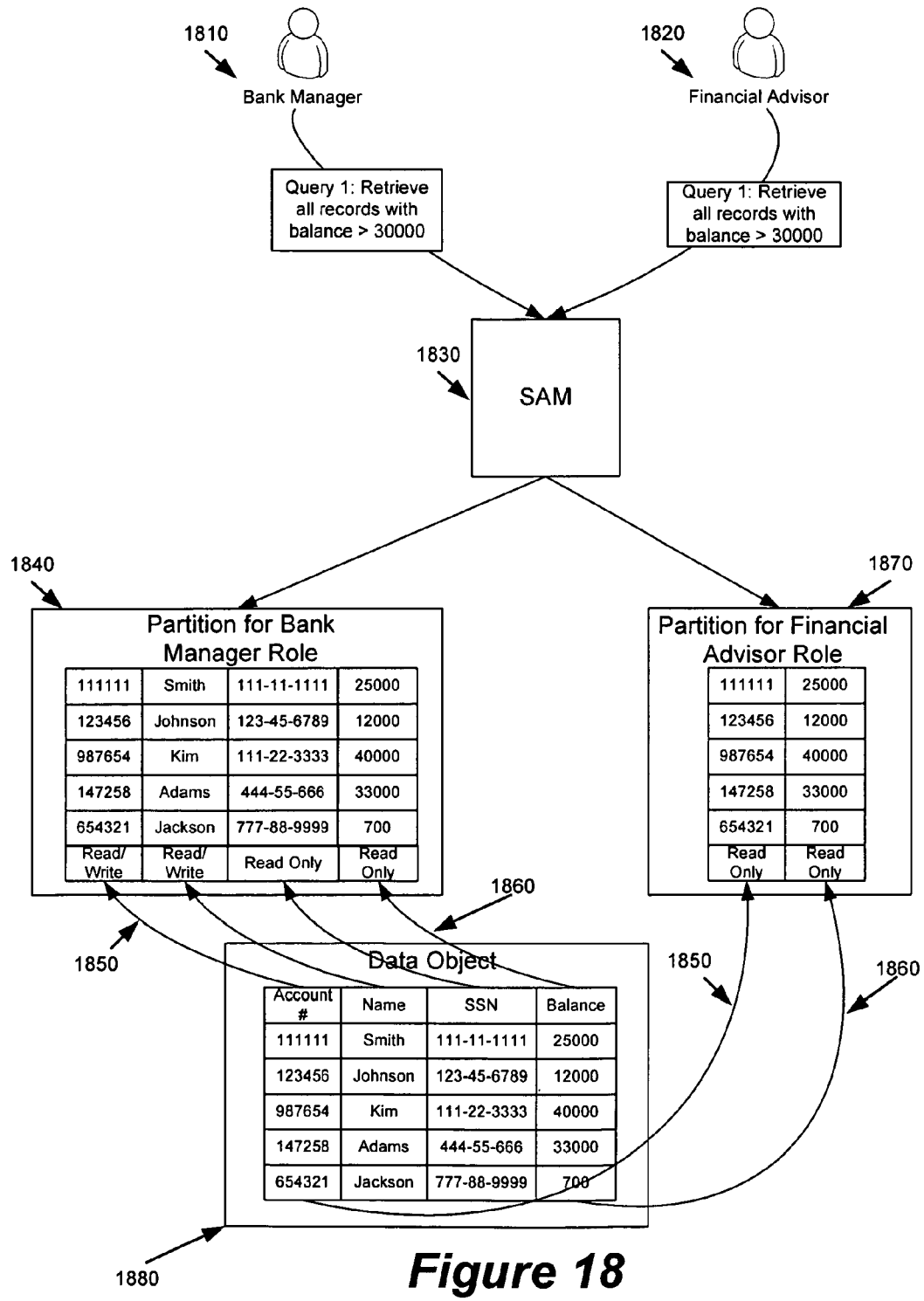
FIG. 18 illustrates how some embodiments of the SAM specify even greater granular security access control over the data attributes of a logical data partition by defining multiple secure resources from a single data partition.

FIGS. 17-18 provide additional illustrations of the extended role based access control of some embodiments restricting data access for users associated with different roles in an enterprise. FIG. 17 presents a first user 1710 submitting a first request 1720 and a second user 1730 submitting a second request 1740 to a SAM 1750 providing the extended role based access control in accordance with some embodiments.

In this figure, the first user 1710 represents a financial advisor operating at a branch located in the state of New York. The first query 1720 requests access to all accounts with a balance greater than $30,000.00. Similarly, the second user 1730 represents a financial advisor operating at a branch located in the state of California. The second query 1740 requests access to all accounts with a balance greater than $30,000.00.

In a traditional role based access control model, both users would be given access to the entire data object 1760 storing the accounts data attributes because both users share the same role (i.e., financial advisor). This would allow the first user 1710 to gain access to accounts of the second user 1730 and vice versa. To restrict the user's scope of visibility by filtering the data attributes of the data object in such a traditional role based access control model would be a role otherwise reserved for implementation by the requesting application. For master data accessible by multiple applications, the security access control would have to be redundantly implemented in each such application, thus creating the potential inconsistencies in the implementation of the security policies across different systems.

Some embodiments provide the security access control for any of two or more applications accessing master data by automatically appending the one or more user attributes to the user query in order to execute the filters associated with the logical partitions. In this manner, security access control is provided for all such applications irrespective of whether the applications provide their own security access control.

In FIG. 17, the SAM 1750 first identifies logical partitions accessible by each user based on the user assigned roles. Since both users 1710 and 1730 are assigned the same role, the users are both presented the same logical partition with the same set of filters. However, the filters specify different policy based rules based on the user branch profile attribute. Accordingly, when the filter of the logical partition is instantiated for user 1710 who is affiliated with the New York branch, the user 1710 is provided access to the subset of data attributes illustrated within the logical partition 1770. The subset of data attributes in partition 1770 is specific to New York state account data. Similarly, when the filter of the logical partition is instantiated for user 1730 who is affiliated with the California branch, the user 1730 is provided access to the subset of data attributes illustrated within the logical partition 1780. The subset of data attributes in partition 1780 is specific to California state account data.

Therefore, the SAM 1750 performs the first user's 1710 query only over the New York logical partitioned 1770 subset of the account data object 1760. The SAM 1750 also performs the second user's 1730 query only over the California logical partitioned 1780 subset of the account data object 1760. In this manner, even though both users 1710 and 1730 share the same role and both their queries specify the same parameters, some embodiments provide more granular security access by filtering different data attributes and by providing different access rights to the filtered data attributes.

Such an extended role based access control model secures the data so that the first user 1710 is unable to accidentally modify the accounts of the second user 1730 and vice versa. Moreover, processing each of the data requests occurs more efficiently as the SAM 1750 need only perform the request over the identified logical partitions 1770 or 1780 as opposed to all the data attributes of the data object 1760, resulting in fewer data attributes to search and analyze.

FIG. 18 illustrates how some embodiments of the SAM specify even greater granular security access control over the data attributes of a logical data partition by defining policy based access controls to the logical partition. In FIG. 18, a query from a first user 1810 with the role of a bank manager is allowed access to the data attributes in logical partition 1840 based on datasets from physical data object 1880 and user profile attributes where the role attribute identifies the partition and the branch attribute instantiates the filter for the partition. Similarly, a query from a second user 1820 with the role of a financial advisor is allowed access to the data attributes in logical partition 1870.

In contrast to FIG. 17 where all the data attributes in each of the logical partitions 1770 and 1780 share common access rights, each column in the logical partitions 1840 and 1870 may be configured with different access rights. Some embodiments facilitate this more granular security control over the logical partitions 1840 and 1870 by defining policy based or rule based access controls to the columns. In this manner, each of the columns in logical partitions 1840 and 1870 can be made to represent individual secure resources with a particular level of access.

As a result, the same data attribute in different partitions can be configured with different security access permissions. For instance, the data attribute 1850 in the logical partition 1840 is configured to provide read and write access permission, whereas the data attribute 1850 in the logical partition 1870 is configured to provide with only read access permission. Additionally, different data attributes within the same logical partition can be configured to provide different security access permissions. For instance, the data attribute 1850 in the logical partition 1840 is configured to provide read and write access permissions, whereas the data attribute 1860 in the logical partition 1840 is configured to provide only read access permission.

It should be apparent to one of ordinary skill in the art that the logical partitions described above are conceptual and do not represent actual instantiations of objects or data structures. For instance, the query that is modified to include the parameterized filters is still performed over the entire data objects. However, by virtue of the parameterized filters, the query is only allowed access to a restricted set of the data attributes determined by the parameterized filters. This restricted set of the data attributes represents the logical partition. Similarly, the secure resources defined by the various rules or filters need not include a data structures that contains the rules or filters. Rather, each such rule or filter may be stored within a policy store with links (i.e., pointers) that determine the association of the rule or filter to one or more user roles.

B. Virtual Security Object

In some embodiments, the secure resources controlled by the SAM include virtual security objects. Virtual security objects manage the security policies for data attributes from multiple different physical objects that reside within any level of an enterprise security hierarchy through a single definition of the virtual security object. Specifically, a security policy is configured for the virtual security object and the security policy is inherited by all data attributes associated with the virtual security object. Accordingly, security access control is specified to a logical structure spanning multiple physical structures.

Through the virtual security objects of some embodiments, a security administrator is able to administer security access control over data objects and various different types of data attributes without having to specify the security access control to each individual object or resources included within the virtual security object. Instead, by grouping data attributes and data objects of two or more physical structures within a single virtual security object, the security policy need only be defined once for the virtual security object. Subsequent changes to the security policy for all data attributes are performed in a similar manner by changing the security policy of the virtual security object.

Users continue to access the data through the corresponding physical structures. However, security access control policies of a virtual security object defined for accessed data will override and determine the access rights to such data. If there is no corresponding virtual security object defined for the data being accessed, then the hub security access control setting for the data is used. Accordingly, users accessing the data are unaware of the virtual security objects defined by the security administrator.

Figure 19:
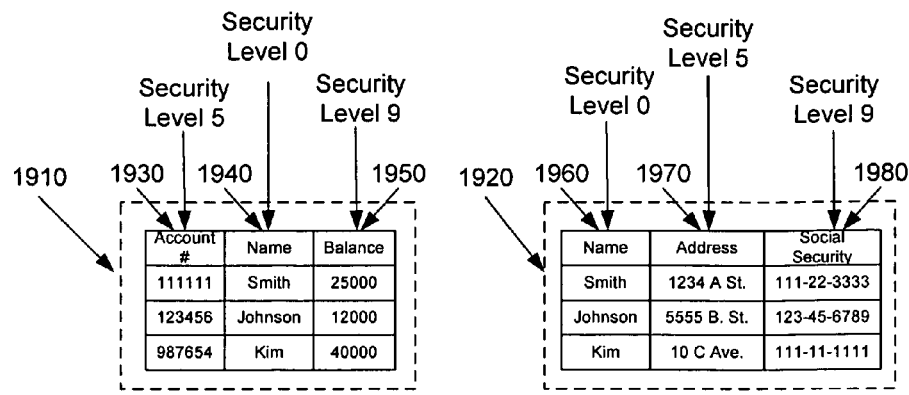
FIG. 19 illustrates two data objects with multiple data attributes with each data attribute having different access rights than other data attributes of the data object.
Figure 20:
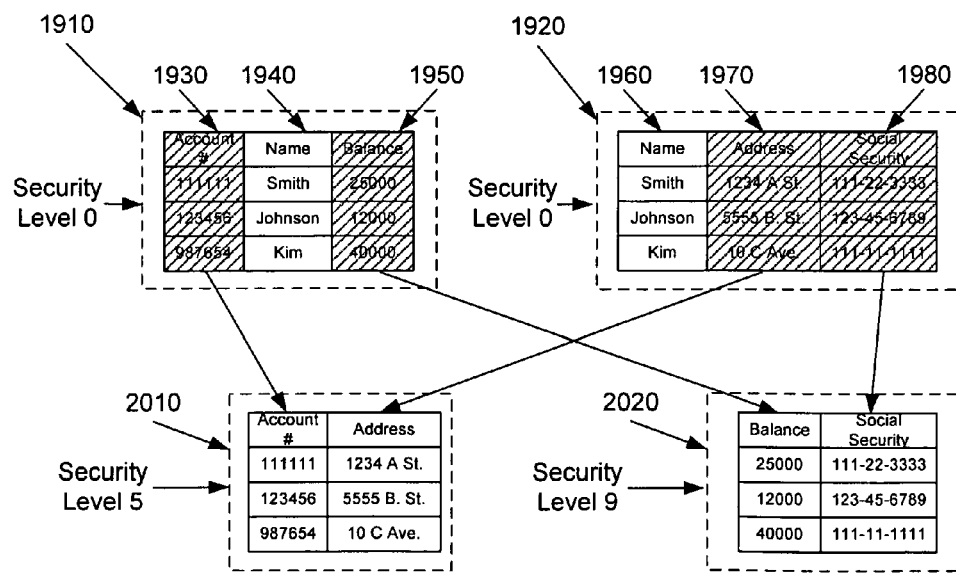
FIG. 20 illustrates the securing of the data attributes of FIG. 19 using virtual security objects in accordance with some embodiments of the invention.

FIGS. 19-20 illustrate the use of virtual security objects to administer security over a group of data attributes stored in different physical objects. FIG. 19 illustrates two data objects 1910 and 1920 with multiple data attributes with each data attribute having different access rights than other data attributes of the data object. Data object 1910 includes an account number data attribute 1930 with a security level of 5, a name data attribute 1940 with a security level of 0, and a balance data attribute 1950 with a security level of 9. Data object 1920 includes a name data attribute 1960 with a security level of 0, an address data attribute 1970 with a security level of 5, and a social security number data attribute 1980 with a security level of 9. In this figure, a security level of 9 specifies the most restricted access and a security level of 0 specifies the least restricted access.

In order to secure each data attribute separately, ordinarily a security administrator would have to define a security policy for each data attribute. In FIG. 19, the security administrator specifies six different security policies, one for each data attribute of each data object 1910 and 1920. However, by introducing virtual security objects, the overhead for administering access control rules for securing the data attributes is reduced as shown in FIG. 20.

FIG. 20 illustrates the securing of the data attributes of FIG. 19 using virtual security objects in accordance with some embodiments of the invention. In this figure, a security administrator globally assigns the highest level of access rights to each data object 1910 or 1920. The security administrator then defines two virtual security objects 2010 and 2020 to customize the security access control for individual data attributes in the data objects 1910 and 1920.

The virtual security object 2010 is defined to provide security access control over data attribute 1930 of data object 1910 and data attribute 1970 of data object 1920 both of which require the same level of security as shown in FIG. 19 (i.e., security level 5). Therefore, instead of having to define the security settings for each data attribute separately as done above in FIG. 19, some embodiments permit the security administrator the ability to define a single security setting for both data attributes simultaneously by specifying the security setting for the virtual security object 2010. The specified security setting for the virtual security object 2010 is then applied to each data attribute within it.

Similarly, the virtual security object 2020 is defined to provide security access control over data attribute 1950 of data object 1910 and data attribute 1980 of data object 1920 both of which require the same level of security as shown in FIG. 19 (i.e., security level 9). Again, the security administrator specifies a single security setting for the virtual security object 2020 such that the security setting is applied to all data attributes within the virtual security object 2020, namely 1950 and 1980.

As evident in FIGS. 19 and 20, the virtual security objects of some embodiments reduce the security administration overhead typically associated with rule/policy based access controls. The virtual security objects continue to provide attribute level security when needed without having to individually specify rules or policies for each data attribute of each data object separately. Instead, the virtual security objects of some embodiments combine the redundantly applied security settings of multiple different data objects into a single virtual security object over which security administration is efficiently controlled. For instance, in FIG. 19 to secure each of the three data attributes of the two data objects 1910 and 1920 separately, a security administrator would have to specify six distinct security policies. However, by utilizing the virtual security objects of some embodiments to remove the redundant specification of similar security settings for data attributes of distinct data objects, the security administrator need only specify three distinct security settings.

In the worst case where each data attribute of each data object requires a unique security setting, the virtual security object requires the same level of security administration as would ordinary rule/policy based access controls. However, since most data attributes share a small set of different security settings, the use of the virtual security objects of some embodiments over traditional rule/policy based access controls will reduce the administrative overhead in securing the data attributes.

Figure 21:
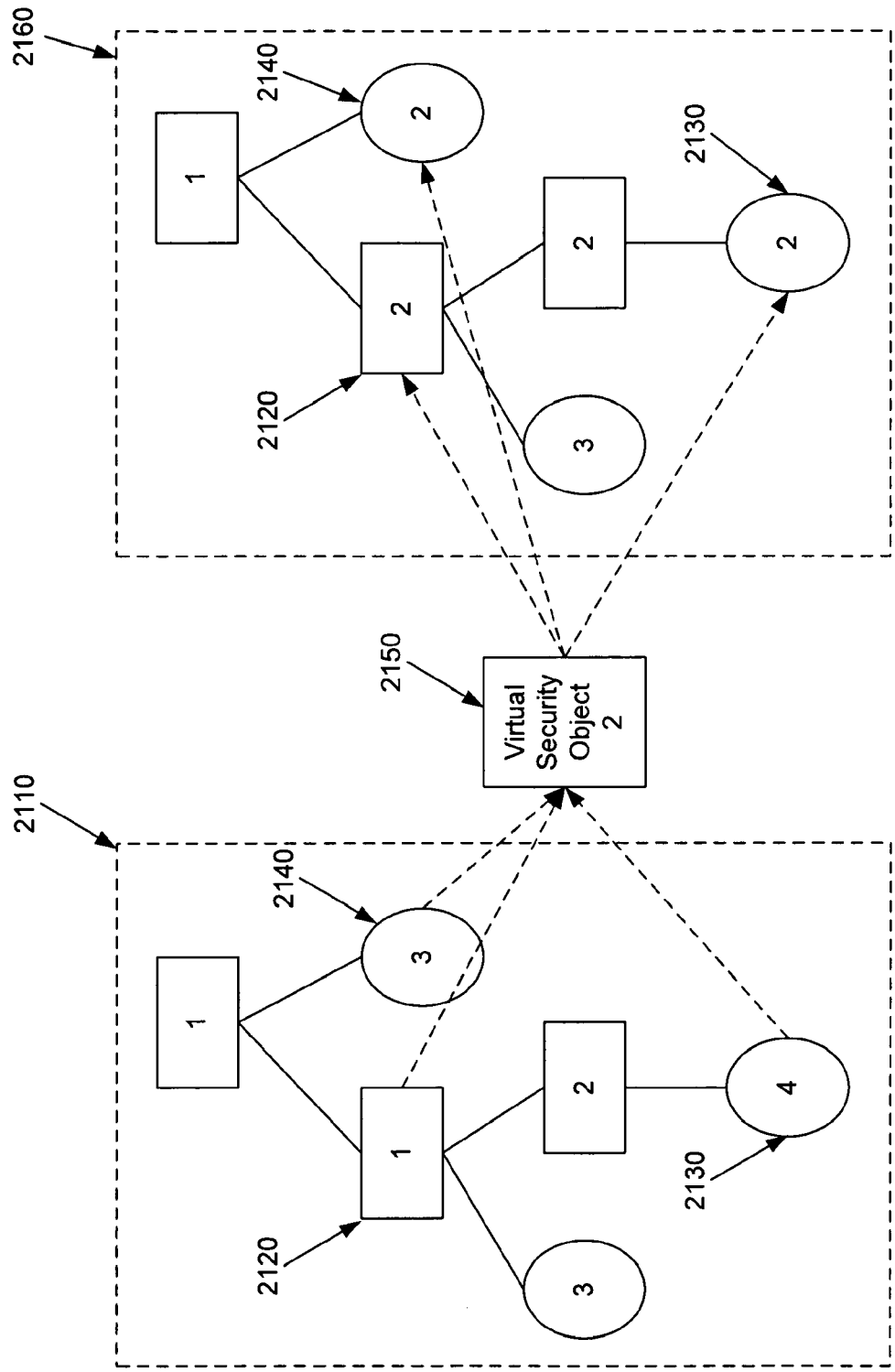
FIG. 21 illustrates that through a single instance of a virtual security object, security policies can be administered to multiple different levels of a data hierarchy while preserving the hierarchical relationships.

FIG. 21 illustrates an additional benefit of the virtual security objects provided by some embodiments. Specifically, FIG. 21 illustrates that through a single instance of a virtual security object, security policies can be administered to multiple different levels of a physical object hierarchy while preserving the hierarchical relationships. The figure presents a data hierarchy 2110 that includes various data attributes each with a particular security permission. For example, the data attribute 2120 specifies a security permission of "1", the data attribute 2130 specifies a security permission of "4", the data attribute 2140 specifies a security permission "3" with each security permission providing different levels (e.g., read only, read/write, etc.) of access to the associated data attribute.

A security administrator wishing to modify the security permissions for the data attributes 2120-2140 ordinarily would have to traverse the hierarchy 2110 to reach each of the data attributes 2120-2140 at which time the security permission for that particular data attribute could be modified. However, by defining a virtual security object 2150 and assigning the data attributes 2120-2140 to the virtual security object 2150, a security administrator need only change the security permissions for the virtual security object 2150. Once the security permissions for the virtual security object 2150 are changed, the changed security permissions are automatically applied to all the data attributes 2120-2140 assigned to the virtual security object 2150.

In FIG. 21, a security administrator defines the security permission for the virtual security object 2150 to be "2". As shown in the modified data hierarchy 2160, the security permissions for each data attribute 2120-2140 is modified such that the security permission for each data attribute 2120-2140 has been changed to "2". Moreover, once the virtual security object 2150 is defined and the data attributes 2120-2140 are associated with the virtual security object 2150, subsequent security permission changes can be applied to the data attributes 2120-2140 without having to redefine the virtual security object 2150. In this manner, data attributes that require the same security permissions but that are dispersed across different levels of the data hierarchy or across multiple different data hierarchies can still be managed efficiently through a single instance of a virtual security object.

Figure 22:
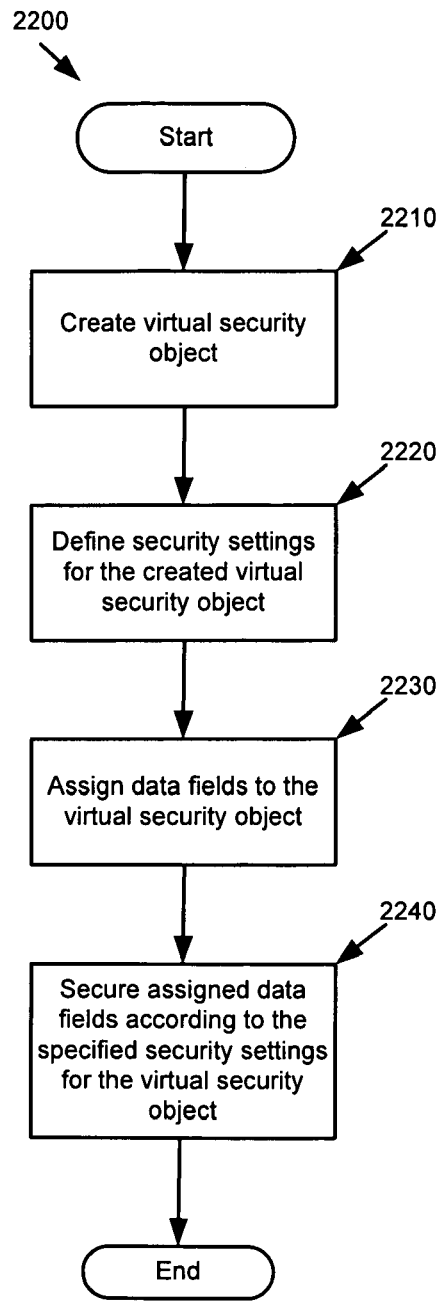
FIG. 22 presents a process for securing one or more data attributes of two or more distinct data objects that share similar security settings through the use of the virtual security objects of some embodiments.

FIG. 22 presents a process 2200 for securing one or more data attributes of two or more distinct data objects that share similar security settings through the use of the virtual security objects of some embodiments. The process 2200 begins by creating (at 2210) a virtual security object. Such actions are performed by a security administrator who is tasked with securing the data attributes within an enterprise or other entity where data is shared amongst multiple different users. The process defines (at 2220) security settings for the instantiated virtual security object. In some embodiments, defining the security settings includes specifying which user roles have access to the data attributes included within the virtual security object and the type of access permitted for each role. For instance, a security administrator may desire to obfuscate all digits except for the last four digits of credit card numbers stored within a shared data attribute. Accordingly, when defining the security settings for the virtual security object securing the credit card data attribute, the security administrator specifies that users associated with a first role are only permitted access to the last four digits with the other digits becoming obfuscated while users associated with a second role are permitted access to all digits of the credit card numbers in the data attributes secured by the virtual security object.

The process then requires that one or more data attributes from one or more different data objects be assigned to the virtual security object. Accordingly, the security administrator assigns (at 2230) the data attributes to the virtual security object. The assignment of data attributes may occur at the time of the virtual security object creation or at any subsequent time thereafter. The process then secures (at 2240) access to the included data attributes according to the security settings specified for the virtual security object irrespective of the actual physical data structure in which the data attributes are stored.

Figure 23:
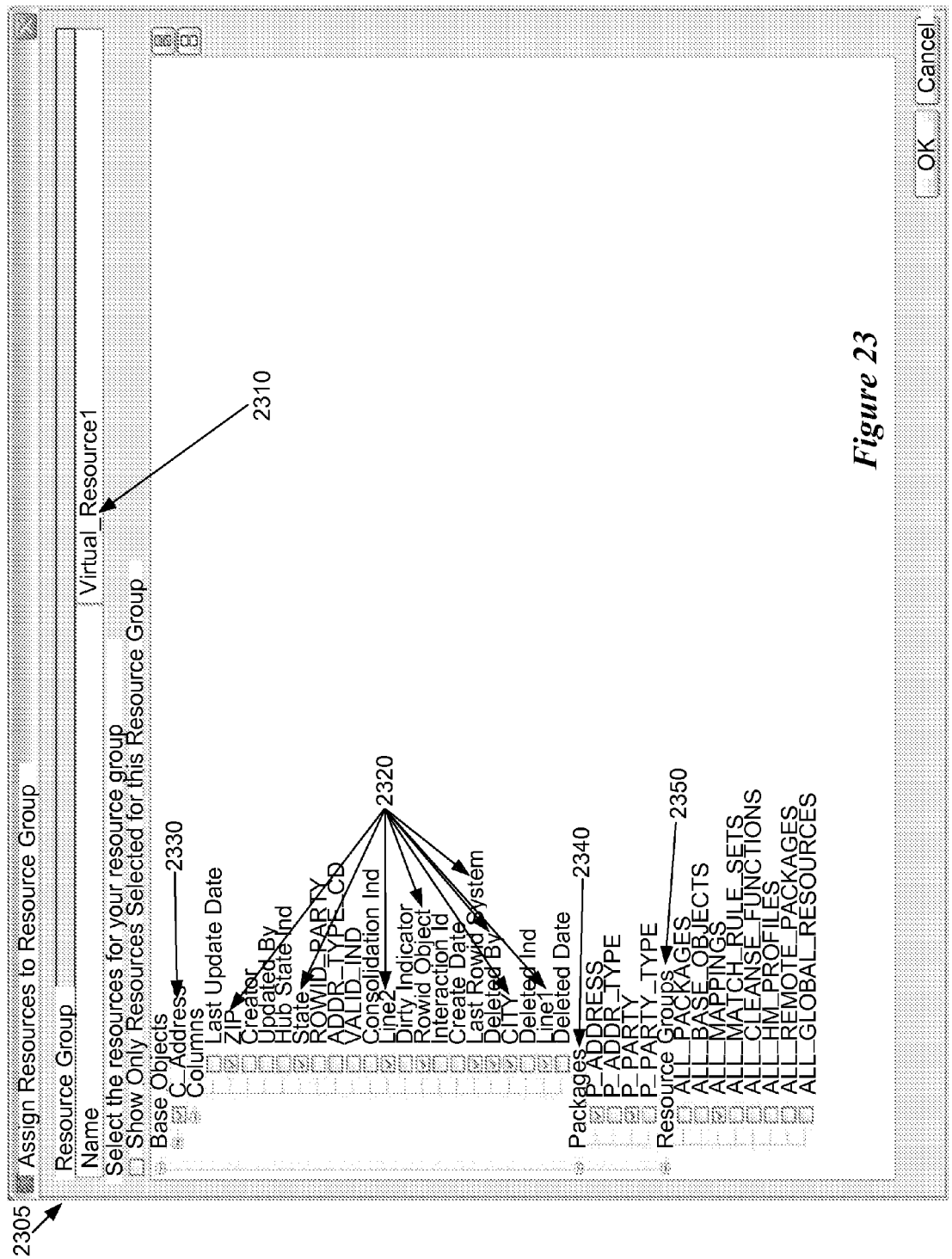
FIG. 23 illustrates a graphical user interface from which one or more virtual security objects are created.

FIG. 23 illustrates a graphical user interface 2305 from which one or more virtual security objects are created. Specifically, a security administrator creates a virtual security object by assigning an identifier 2310 to the virtual object so that it may be subsequently accessed in order (1) to modify the access permissions of the virtual security object or (2) to add or remove data attributes or data objects from the virtual security object. In this figure, a virtual security object is created having the identifier "VIRTUAL_RESOURCE_1" 2310.

The security administrator then selects the various objects and data attributes to secure using the virtual security object. For instance, the security administrator has specified that the data attributes 2320 that include "ZIP", "STATE", "Line2", "Rowid Object", "Last Rowid System", "Deleted By", "CITY", and "Line1" of the data object "C_ADDRESS" 2330 are to be secured using the virtual security object. Additionally, the virtual security object may secure various packages 2340 and resource groups 2350 that are to be secured using the virtual security object.

Figure 24:
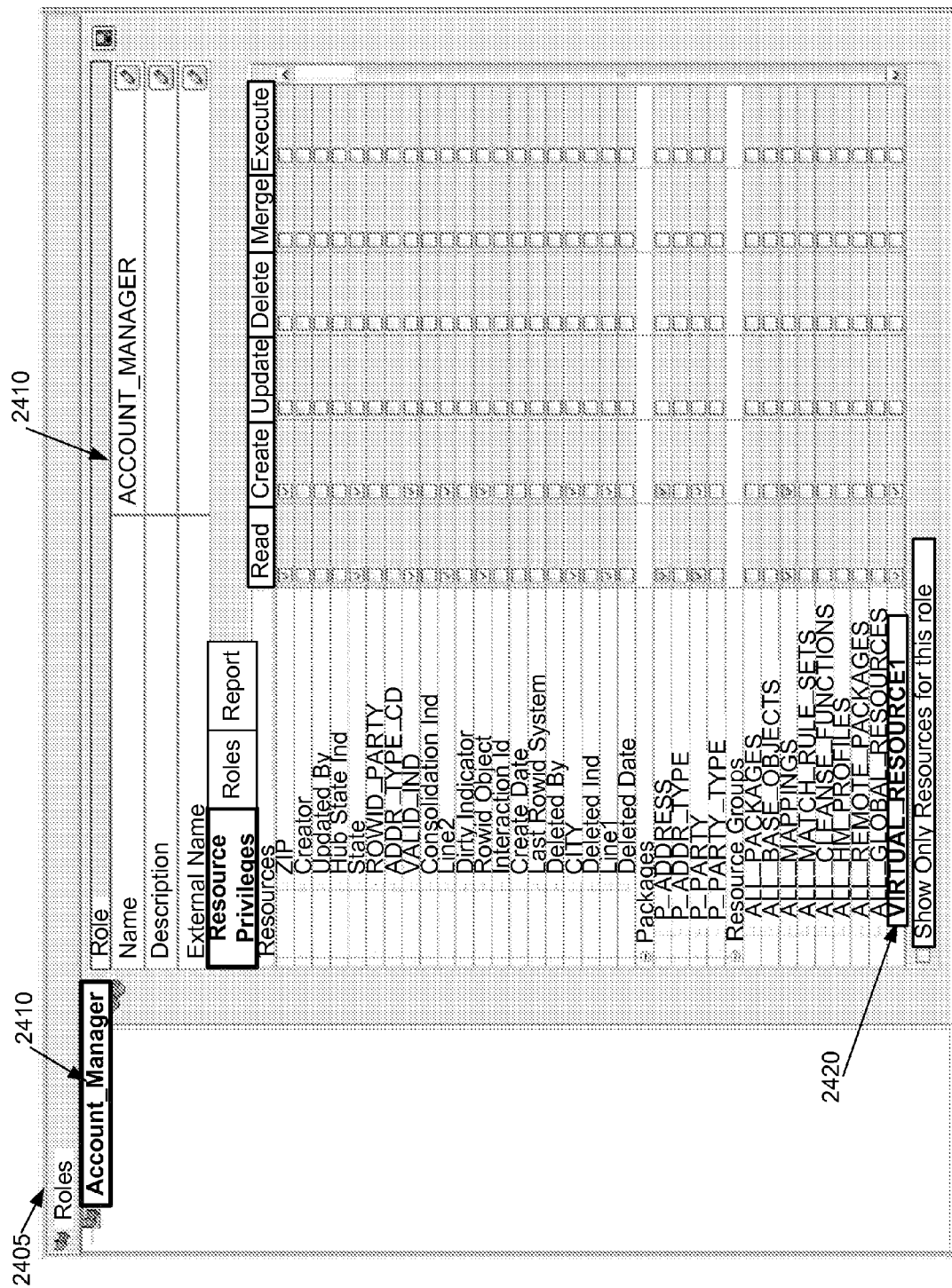
FIG. 24 illustrates a graphical user interface from which access permissions are assigned to a created virtual security object.

FIG. 24 illustrates a graphical user interface 2405 from which access permissions are assigned to a created virtual security object. Specifically, the graphical user interface 2405 configures the access permissions based on user roles. As shown, for a user assigned the role of an ACCOUNT_MANAGER 2410, the virtual security object 2420 is configured to provide read and create access permissions to its associated data attributes, objects, packages, and resource groups associated that were defined using the graphical user interface 2305 of FIG. 23.

It should be apparent to one of ordinary skill in the art that the virtual security object in some embodiments is a logical construct that does not involve the actual copying or moving of the data attributes. Rather, some embodiments of the virtual security object include the association of pointers to the data attributes as they exist within the physical data objects, where the pointers point to a shared security setting for controlling the security access control for all data attributes sharing the same pointer. Moreover, in some embodiments, the security administrator directly assigns the data attribute to an already existing virtual security object through an identifier associated with the virtual security object. Some embodiments allow the security administrator to customize the virtual security object identifier with a user specified name for example.

IV. Computer System

Figure 25:
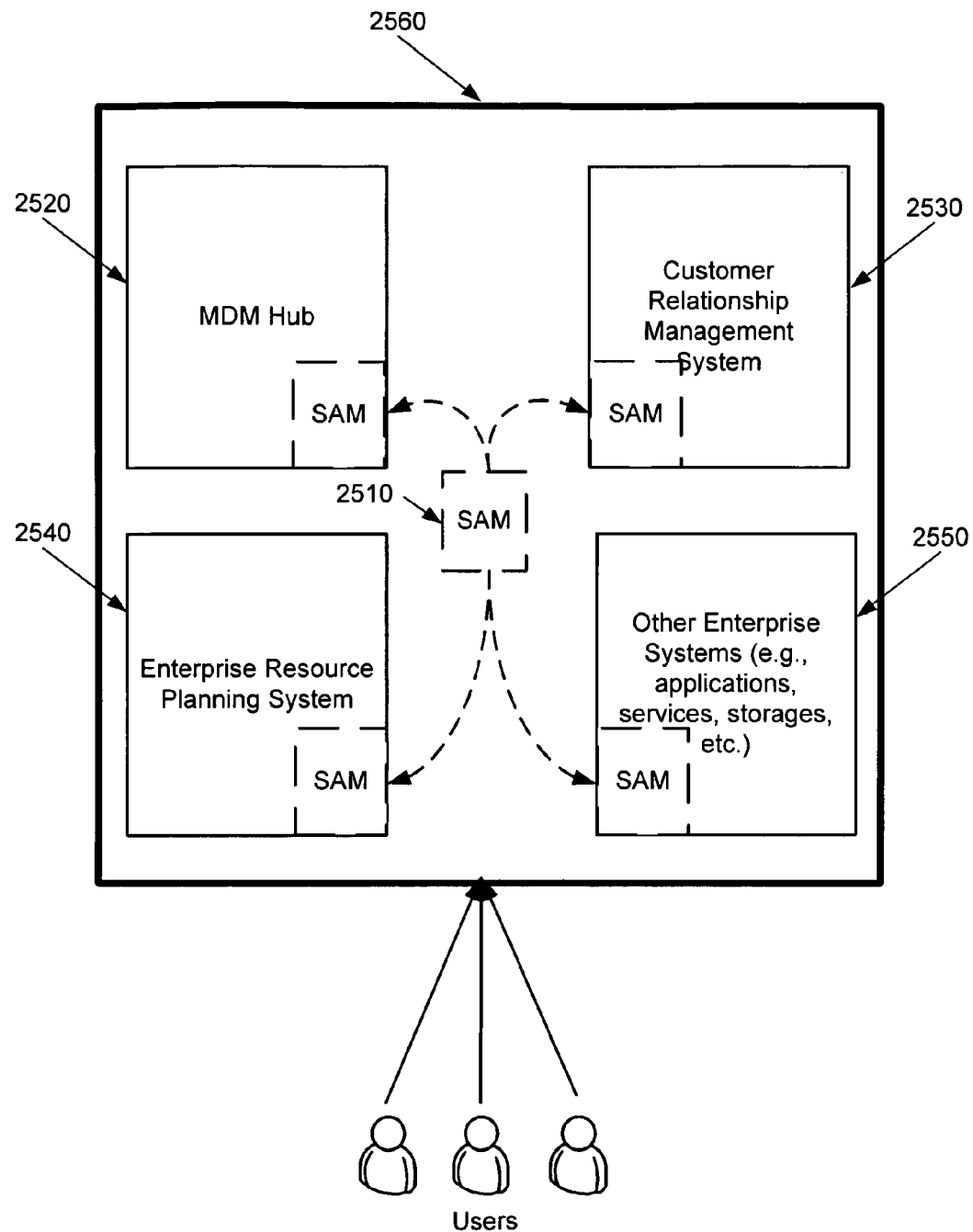
FIG. 25 illustrates different contexts by which a SAM of some embodiments may be integrated into an enterprise.

In the above examples and corresponding description, the SAM is demonstrated as a generic security module in the context of an MDM hub. However, it should be apparent to one of ordinary skill in the art that the SAM of some embodiments and the corresponding functionality implemented by the SAM may be positioned and used as part of other applications or resources of the enterprise. For example in FIG. 25, the SAM 2510 of some embodiments is shown in the context of either the MDM hub 2520, Customer Relationship Management (CRM) module 2530, Enterprise Resource Planning (ERP) module 2540, or other enterprise services/modules/storages 2550 of the enterprise 2560.

Additionally, many of the above-described modules and processes (e.g., SAM, logical data partitions, virtual security objects) are implemented as software processes that are specified as a set of instructions recorded on a machine readable medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc.

In this specification, the term "software" is meant in its broadest sense. It can include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention.

Figure 26:
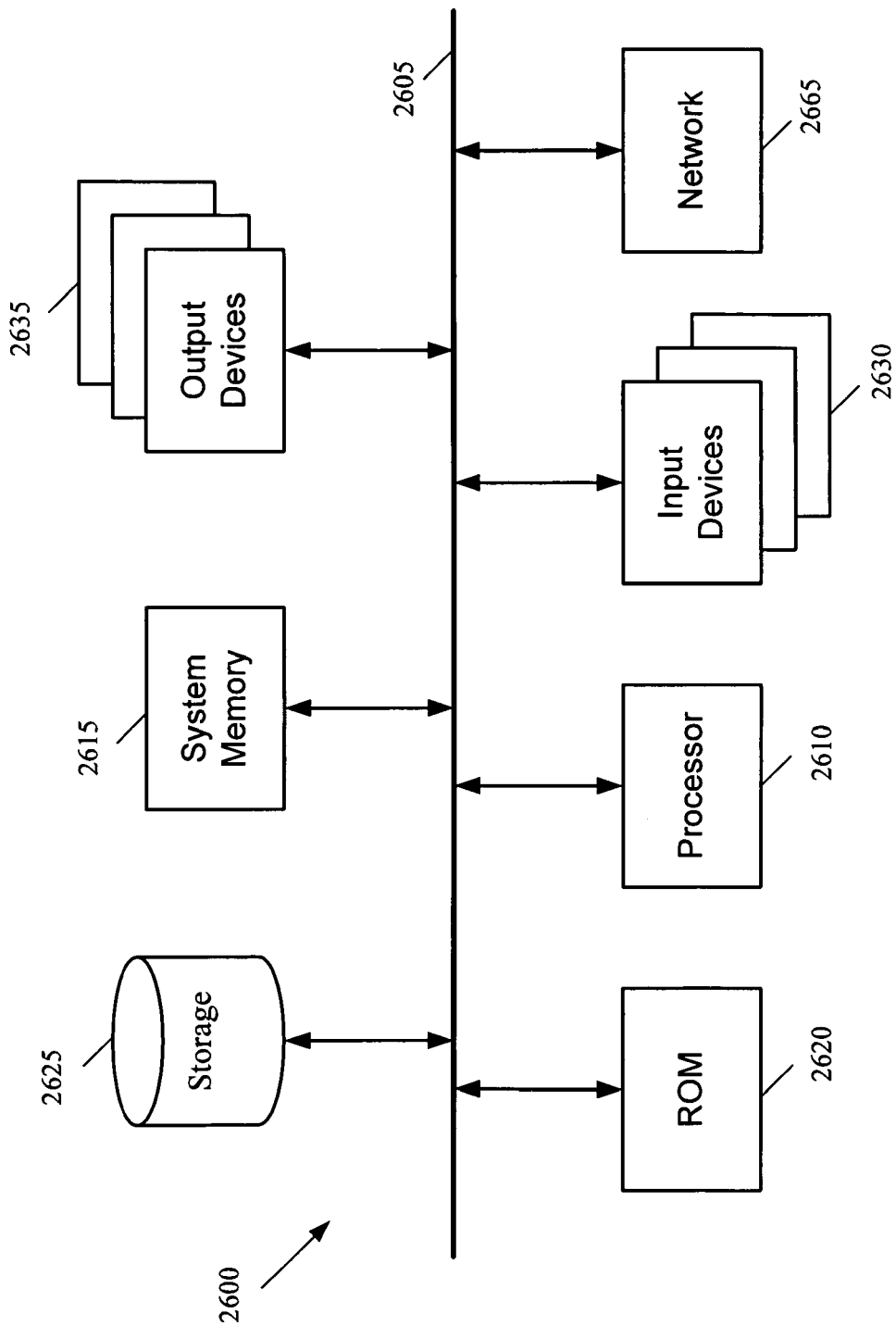
FIG. 26 illustrates a computer system with which some embodiments of the invention are implemented.

FIG. 26 is a block diagram of an illustrative computing system 2600 suitable for implementing an embodiment of the present invention. Computer system 2600 includes a bus 2606 or other communication mechanism for communicating information, which interconnects subsystems and devices, such as processor 2610, system memory 2615 (e.g., RAM), static storage device 2620 (e.g., ROM), disk drive 2625 (e.g., magnetic or optical), communication interface 2665 (e.g., wireless 802.11b/g or Ethernet card), input device 2630 (e.g., keyboard or cursor control), and output device 2635 (e.g., display monitor).

According to one embodiment, computer system 2600 performs specific operations by processor 2610 executing one or more sequences of one or more instructions contained in system memory 2615. Such instructions may be read into system memory 2615 from another computer readable/usable medium, such as static storage device 2620 or disk drive 2625. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium", "computer readable storage medium", or "computer usable medium" as used herein refers to any tangible medium that participates in providing instructions to processor 2610 for execution. Such a medium may take many forms, including but not limited to, non-volatile media and volatile media. Non-volatile media includes, for example, optical or magnetic disks, such as disk drive 2625. Volatile media includes dynamic memory, such as system memory 2615. Common forms of computer readable media includes, for example, floppy disk, flexible disk, hard disk, magnetic tape, any other magnetic medium, DVD-ROM, DVD-RAM, CD-ROM, any other optical medium, RAM, PROM, EPROM, FLASH-EPROM, any other memory chip or cartridge, or similar tangible medium from which a computer can read.

In an embodiment of the invention, execution of the sequences of instructions to practice the invention is performed by a single computer system 2600. According to other embodiments of the invention, two or more computer systems 2600 coupled by the communication interface 2665 (e.g., LAN, PTSN, or wireless network) may perform the sequence of instructions required to practice the invention in coordination with one another.

Computer system 2600 may transmit and receive messages, data, and instructions, including program, i.e., application code, through the communication interface 2665. Received program code may be executed by processor 2610 as it is received, and/or stored in disk drive 2625, or other non-volatile storage for later execution.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. For a data management system that secures access to a plurality of data objects contained in a data hierarchy of an enterprise, a method of securing access to data attributes of the data objects, said method comprising:
   receiving an identification of a first set of data attributes of a first data object, said first set of data attributes corresponding to a first set of data values of the first data object;
   receiving an identification of a second set of data attributes of a second data object that is hierarchically related to the first data object in the data hierarchy, said second set of data attributes corresponding to a second set of data values of the second data object;
   defining, from the first and second sets of data attributes, a virtual security object that represents a logical object which allows the first and second sets of data attributes to be uniformly secured as one group; and
   applying a set of control permissions that is received for the virtual security object uniformly across the first and second sets of data attributes while maintaining the hierarchical relationship between the first and second data objects in the data hierarchy, wherein the set of control permissions is used to control access to the data values of the first and second sets of data attributes in response to user queries.

2. The method of claim 1, wherein at least one of the first and second sets of data attributes comprises less than all the data attributes of the corresponding data object.

3. The method of claim 1 further comprising performing a query over at least one of the first and second data objects, wherein access to the data attributes of the queried data object is restricted based on the set of control permissions applied to the data attributes.

4. The method of claim 1, wherein the the set of control permission controls access to the data values of the first and second sets of data attributes for different applications of the enterprise.

5. The method of claim 4, wherein the set of control permissions is applied transparently to the operations of the applications.

6. The method of claim 1, wherein the set of control permissions is associated with a role that is assigned to people in the enterprise.

7. The method of claim 1, wherein the first and second sets of data attributes comprise at least two of data files, data objects, and data directories.

8. The method of claim 1 further comprising:
   receiving modifications to the set of control permissions for the virtual security object; and
   applying the modified set of control permissions uniformly across the data attributes identified for the virtual security object.

9. The method of claim 1, wherein the set of control permissions comprises at least one of read, write, create, update, delete, and merge that is applied uniformly across the identified data attributes.

10. For a data management system that secures access to a plurality of data objects stored within a data hierarchy of an enterprise, a method of securing access to data attributes of the data objects, said method comprising:
    providing a first user interface tool for (i) receiving an identification of a first set of data attributes of a first data object, (ii) receiving an identification of a second set of data attributes of a second data object that is hierarchically related to the first data object in the data hierarchy, and (iii) defining, from the first and second sets of data attributes, a virtual security object that represents a logical object which allows the first and second sets of data attributes to be uniformly secured as one group, wherein the first set of data attributes corresponds to a first set of data values of the first data object, and the second set of data attributes corresponds to a second set of data values of the second data object; and
    providing a second user interface tool for applying a set of control permissions that is received for the virtual security object uniformly across the first and second sets of data attributes while maintaining the hierarchical relationship between the first and second data objects in the data hierarchy, wherein the set of control permissions is used to control access to the data values of the first and second sets of data attributes in response to user queries.

11. The method of claim 10, wherein at least one of the first and second sets of data attributes comprises less than all the data attributes of the corresponding data object.

12. The method of claim 10, wherein the second user interface tool is further for associating a role to the set of control permissions.

13. A non-transitory computer readable medium storing a program that secures access to a plurality of data objects stored within a data hierarchy of an enterprise, the program having a graphical user interface (GUI) for securing access to data attributes of the data objects, said GUI comprising:

a first user interface tool for (i) receiving an identification of a first set of data attributes of a first data object, (ii) receiving an identification of a second set of data attributes of a second data object that is hierarchically related to the first data object in the data hierarchy, and (iii) defining, from the first and second sets of data attributes, a virtual security object that represents a logical object which allows the first and second sets of data attributes to be uniformly secured as one group, wherein the first set of data attributes corresponds to a first set of data values of the first data object, and the second set of data attributes corresponds to a second set of data values of the second data object; and a second user interface tool for applying a set of control permissions that is received for the virtual security object uniformly across the first and second sets of data attributes while maintaining the hierarchical relationship between the first and second data objects in the data hierarchy, wherein the set of control permissions is used to control access to the data values of the first and second sets of data attributes in response to user queries.

14. The non-transitory computer readable medium of claim 13, wherein at least one of the first and second sets of data attributes comprises less than all the data attributes of the corresponding data object.

15. A non-transitory machine readable medium storing a program that secures access to a plurality of tables of a database of an enterprise, the program comprising sets of instructions for:

receiving an identification of a first set of data attributes of a first table, said first set of data attributes corresponding to a first set of data values of the first table;

receiving an identification of a second set of data attributes of a second data table that is hierarchically related to the first table in the database, said second set of data attributes corresponding to a second set of data values of the second data table; and defining, from the first and second sets of data attributes, a virtual security object that represents a logical object which allows the first and second sets of data attributes to be uniformly secured as one group; and applying a set of control permissions that is received for the virtual security object uniformly across the first and second sets of data attributes while maintaining the hierarchical relationship between the first and second tables in the database, wherein the set of control permissions is used to control access to the data values of the first and second sets of data attributes in response to user queries.

16. The non-transitory machine readable medium of claim 15, wherein at least one of the first and second sets of data attributes comprises less than all the data attributes of the corresponding table.

17. The non-transitory machine readable medium of claim 15, wherein the set of control permission controls access to the data values of the first and second sets of data attributes for different applications of the enterprise.

18. The non-transitory machine readable medium of claim 17, wherein the set of control permissions is applied transparently to the operations of the applications.

19. The non-transitory machine readable medium of claim 15, wherein the first set of data attributes identified for the virtual security object comprise a plurality of data attributes.

20. The non-transitory machine readable medium of claim 15, wherein the set of control permissions comprises at least one of read, write, create, update, delete, and merge that is applied uniformly across the identified data attributes.

21. The non-transitory machine readable medium of claim 15, wherein the program further comprises a set of instructions for performing a query over at least one of the first and second data objects, wherein access to the data attributes of the queried data object is restricted based on the set of control permissions.

* * * * *